US009728160B2

(12) United States Patent
Yang et al.

(10) Patent No.: US 9,728,160 B2
(45) Date of Patent: Aug. 8, 2017

(54) IMAGE PROCESSING METHOD OF A DISPLAY FOR REDUCING COLOR SHIFT

(71) Applicant: AU Optronics Corp., Hsin-Chu (TW)

(72) Inventors: Meng-Huan Yang, Hsin-Chu (TW); Ting-Wei Hsu, Hsin-Chu (TW); Chien-Wen Chen, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 38 days.

(21) Appl. No.: 14/797,187

(22) Filed: Jul. 13, 2015

(65) Prior Publication Data

US 2016/0267685 A1 Sep. 15, 2016

(30) Foreign Application Priority Data

Mar. 10, 2015 (TW) ............................. 104107637 A

(51) Int. Cl.

| | |
|---|---|
| ***H04N 1/60*** | (2006.01) |
| ***H04N 5/57*** | (2006.01) |
| ***H04N 9/69*** | (2006.01) |
| ***H04N 9/73*** | (2006.01) |
| ***H04N 5/202*** | (2006.01) |
| ***G09G 5/06*** | (2006.01) |
| ***G06T 11/00*** | (2006.01) |
| ***G09G 5/02*** | (2006.01) |
| ***G09G 3/20*** | (2006.01) |

(52) U.S. Cl.

CPC ............. *G09G 5/02* (2013.01); *G09G 3/2003* (2013.01); *G09G 2300/0452* (2013.01); *G09G 2320/028* (2013.01); *G09G 2320/0242* (2013.01); *G09G 2340/0457* (2013.01)

(58) Field of Classification Search

CPC combination set(s) only.
See application file for complete search history.

(56) References Cited

U.S. PATENT DOCUMENTS 8,049,763 B2 11/2011 Kwak
2011/0242149 A1* 10/2011 Yoshida ............... G09G 3/3648 345/690

(Continued)

FOREIGN PATENT DOCUMENTS

CN 101370148 A 2/2009
CN 103035191 A 4/2013

OTHER PUBLICATIONS

State Intellectual Property Office of the P. R. C, "Office Action", Dec. 5, 2016, China.

*Primary Examiner* — Wesner Sajous
(74) *Attorney, Agent, or Firm* — Locke Lord LLP; Tim Tingkang Xia, Esq.

(57) ABSTRACT

An image processing method of a display includes transforming three color image data to four color image data, passing the four color image data through a kernel filter to generate original data corresponding to a first sub pixel and a second sub pixel, and transforming original data of each sub pixel to generate display data of the sub pixel. The original data of the first sub pixel is the same as the original data of the second sub pixel. The brightness of the display data of the first sub pixel is substaintially greater than the original data of the first sub pixel. The brightness of the display data of the second sub pixel is substaintially smaller than the original data of the second sub pixel.

13 Claims, 18 Drawing Sheets

(56) References Cited

U.S. PATENT DOCUMENTS

| | | | | |
|---|---|---|---|---|
| 2011/0254759 | A1* | 10/2011 | Mori | G09G 3/3607 345/88 |
| 2013/0075633 | A1* | 3/2013 | Hu | H05B 33/086 250/552 |
| 2013/0113847 | A1* | 5/2013 | Mori | G02F 1/133514 345/690 |
| 2013/0135567 | A1* | 5/2013 | Lee | G02B 5/201 349/106 |

* cited by examiner

IMAGE PROCESSING METHOD OF A DISPLAY FOR REDUCING COLOR SHIFT

BACKGROUND OF THE INVENTION

1. Field of the Invention

This invention relates to an image processing method of a display, and more particularly, an image processing method of a display that is capable of reducing the issue of color shift.

2. Description of the Prior Art

To generate images with high quality and fine detail, resolution of displays may have to be increased. FIG. 1 shows a display 100 according to prior art. The display 100 adopts a traditional arrangement for three color sub pixels, that is, the three color sub pixels are disposed in a stripe arrangement. Each pixel of the display 100 is similar to the pixel 110 which includes a red sub pixel 120R, a green sub pixel 120G, and a blue sub pixel 120B. However, when increasing the resolution, the visibility rates of the red sub pixel 120R, the green sub pixel 120G and the blue sub pixel 120B are decreased. Therefore, under backlights with same strength, a brightness of a display with higher resolution will be substaintially smaller than a brightness of a display with lower resolution, and the display with higher resolution may even consume more power to maintain the brightness.

To solve the issue of insufficient brightness of the traditional display 100 adopting three color sub pixels, white sub pixels are introduced in prior art. By using the backlight without passing through filter panel to improve the brightness contrast of image, the power consumption can also be reduced. Furthermore, the prior art may also adopt the technic of Sub Pixel Rendering (SPR) to increase the area of a sub pixel for increasing the visibility rate and the brightness of the display. FIG. 2 shows a display panel 200 according to prior art. The display panel 200 includes pixels $\mathbf{210}_1$, $\mathbf{220}_1$, $\mathbf{210}_2$ and $\mathbf{220}_2$. The pixel $\mathbf{210}_1$ includes a sub pixel $\mathbf{230}A_1$ and a sub pixel $\mathbf{230}B_1$, and the pixel $\mathbf{220}_1$ includes a sub pixel $\mathbf{230}C_1$ and a sub pixel $\mathbf{230}D_1$. The sub pixels $\mathbf{230}A_1$, $\mathbf{230}B_1$, $\mathbf{230}C_1$, and $\mathbf{230}D_1$ are sub pixels with four different colors. Similarly, each of the pixels $\mathbf{210}_2$ and $\mathbf{220}_2$ also include two different sub pixels with different colors respectively. Since each of the pixels $\mathbf{210}_1$, $\mathbf{220}_1$, $\mathbf{210}_2$ and $\mathbf{220}_2$ is composed of two sub pixels with two different colors of the four colors, the visibility rate of each sub pixel can be increased and so as to the brightness of the display.

However, when the users observe the image displayed by the display from different angles, each of the users may observe the images with different qualities due to the different refraction rates of the liquid crystal when observed from different angles, namely, the issue of color shift. And, the issue of color shift has become a critical issue to be solved.

SUMMARY

One embodiment of the present invention discloses an image processing method of a display. The image processing method comprises transforming a three color image data to a four color image data, the four color image data passing through a kernel filter to generate original data corresponding to a first sub pixel, a second sub pixel, a third sub pixel, and a fourth sub pixel disposed in sequence, transforming an original data of the first sub pixel to generate a first display data of the first sub pixel, transforming an original data of the second sub pixel to generate a first display data of the second sub pixel, transforming an original data of the third sub pixel to generate a first display data of the third sub pixel, transforming an original data of the fourth sub pixel to generate a first display data of the fourth sub pixel, displaying a first frame of image on the display at least according to the first display data of the first sub pixel, the first display data of the second sub pixel, the first display data of the third sub pixel, and the first display data of the fourth sub pixel. The second sub pixel is adjacent to the first sub pixel and the third sub pixel. The third sub pixel is adjacent to the fourth sub pixel. The first sub pixel, the second sub pixel, the third sub pixel, and the fourth sub pixel are sub pixels with different colors. A brightness of the first display data of the first sub pixel is substaintially greater than a brightness of the original data of the first sub pixel. A brightness of the first display data of the second sub pixel is substaintially smaller than a brightness of the original data of the second sub pixel. A brightness of the first display data of the third sub pixel is substaintially greater than a brightness of the original data of the third sub pixel. A brightness of the first display data of the fourth sub pixel is substaintially smaller than a brightness of the original data of the fourth sub pixel.

Another embodiment of the present invention discloses an image processing method of a display. The image processing method comprises transforming a three color image data to a four color image data, the four color image data passing through a kernel filter to generate original data corresponding to a first sub pixel, a second sub pixel, a third sub pixel, and a fourth sub pixel disposed in sequence, transforming an original data of the first sub pixel to generate a first display data of the first sub pixel, transforming an original data of the second sub pixel to generate a first display data of the second sub pixel, transforming an original data of the third sub pixel to generate a first display data of the third sub pixel, transforming an original data of the fourth sub pixel to generate a first display data of the fourth sub pixel, displaying a first frame of image on the display at least according to the first display data of the first sub pixel, the first display data of the second sub pixel, the first display data of the third sub pixel, and the first display data of the fourth sub pixel. The second sub pixel is adjacent to the first sub pixel and the third sub pixel. The third sub pixel is adjacent to the fourth sub pixel. The first sub pixel, the second sub pixel, the third sub pixel, and the fourth sub pixel are sub pixels with different colors. A brightness of the first display data of the first sub pixel is substaintially greater than a brightness of the original data of the first sub pixel. A brightness of the first display data of the second sub pixel is substaintially greater than a brightness of the original data of the second sub pixel. A brightness of the first display data of the third sub pixel is substaintially smaller than a brightness of the original data of the third sub pixel. A brightness of the first display data of the fourth sub pixel is substaintially smaller than a brightness of the original data of the fourth sub pixel.

Another embodiment of the present invention discloses an image processing method of a display. The display comprises a plurality of pixels, each of pixel comprises a first color sub pixel, a second color sub pixel, a third color sub pixel, and a fourth color sub pixel, sub pixels of a pixel are disposed in a same row. The image processing method comprises inputting a three color image data, wherein the three color image comprises a first color data, a second color data, and a third color data, and when a grayscale of the first color data is substaintially greater than zero and grayscales of the second color data and the third color data are zero, a grayscale displayed by the first color sub pixel is different from the grayscale of the first color data, and grayscales displayed by the second color sub pixel, the third color sub pixel, and the fourth color sub pixel are zero.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
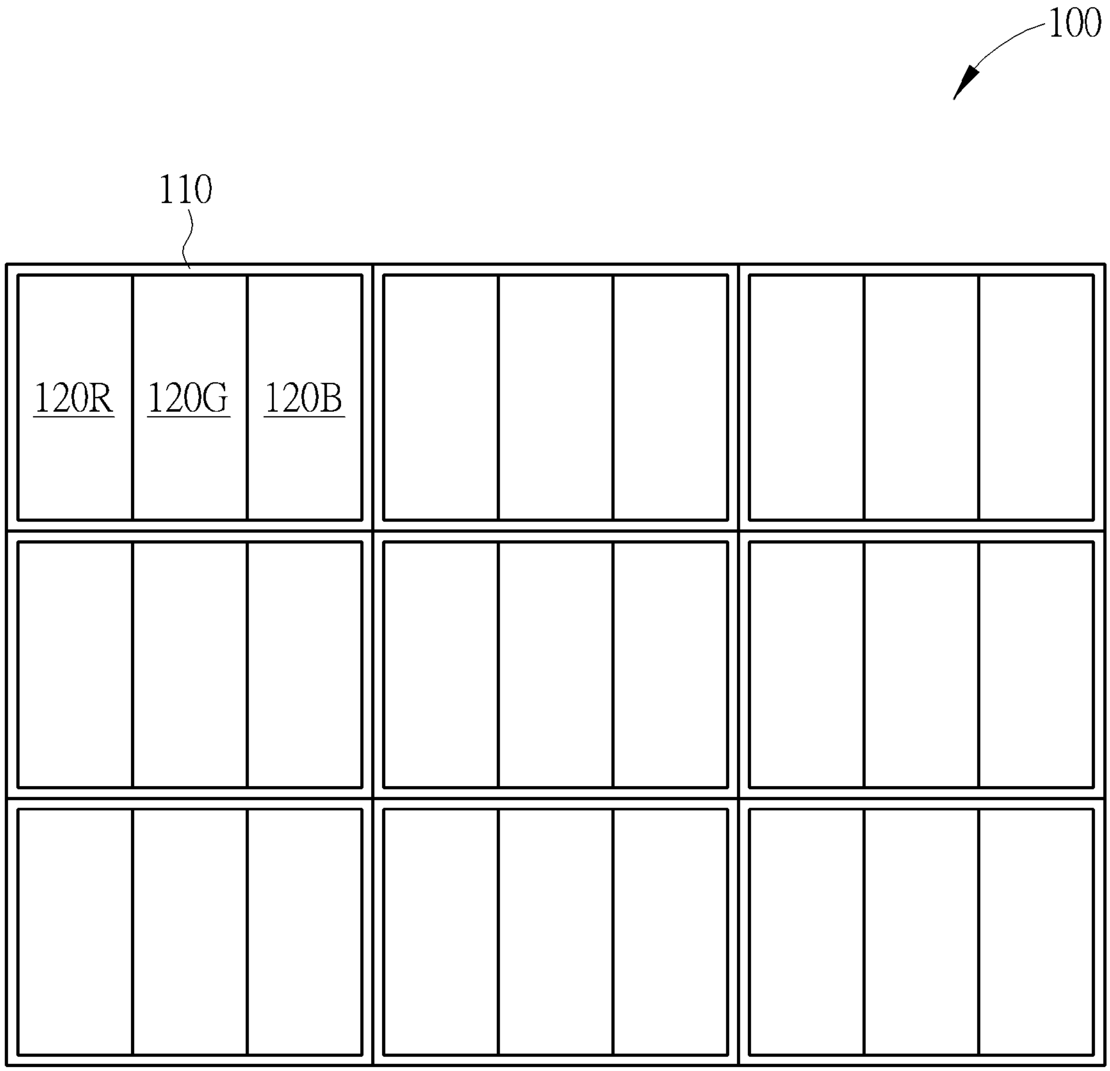
FIG. 1 PRIOR ART
FIG. 1 shows a display panel according to prior art.
Figure 2:
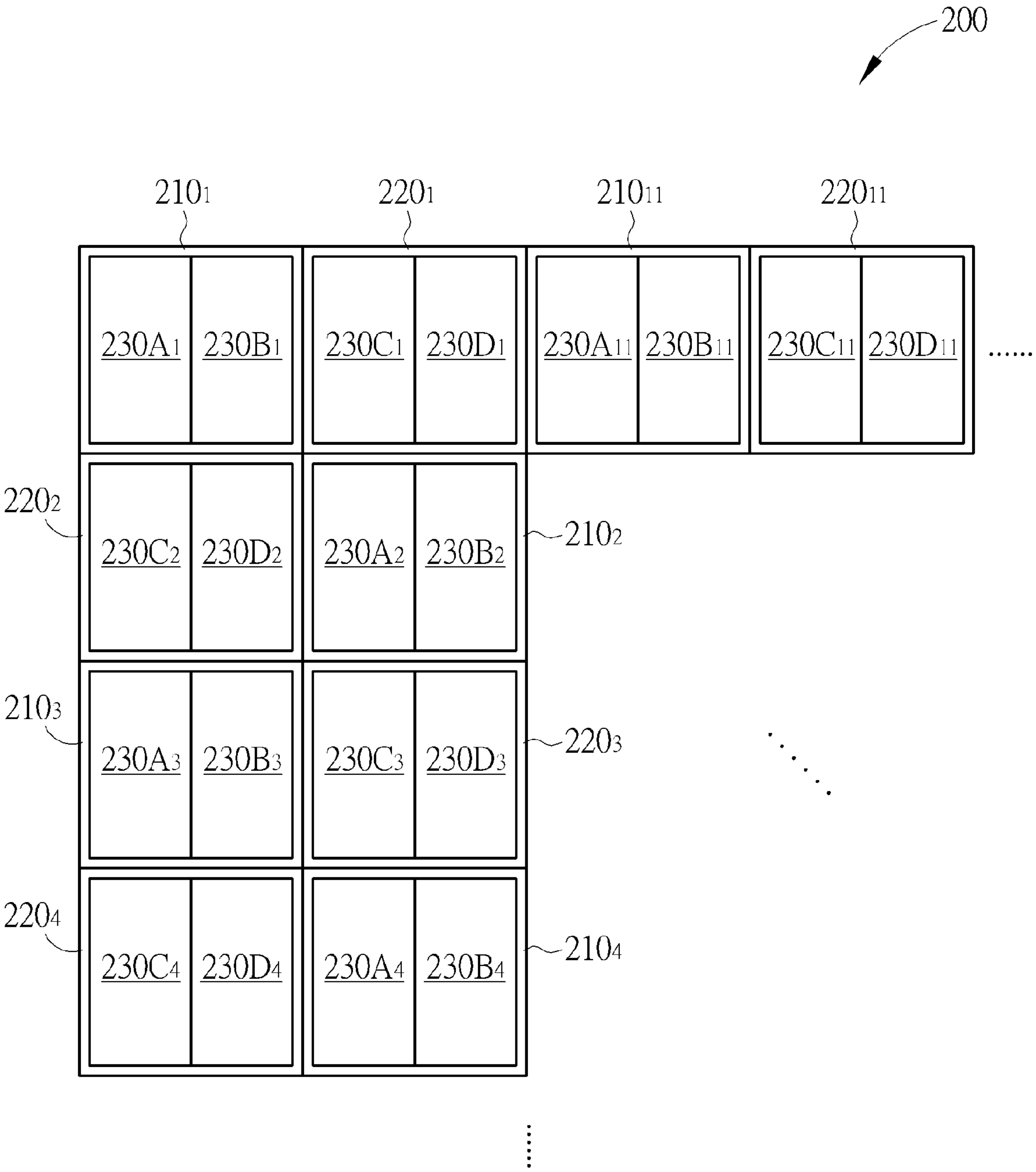
FIG. 2 shows another display panel according to prior art.
Figure 3:
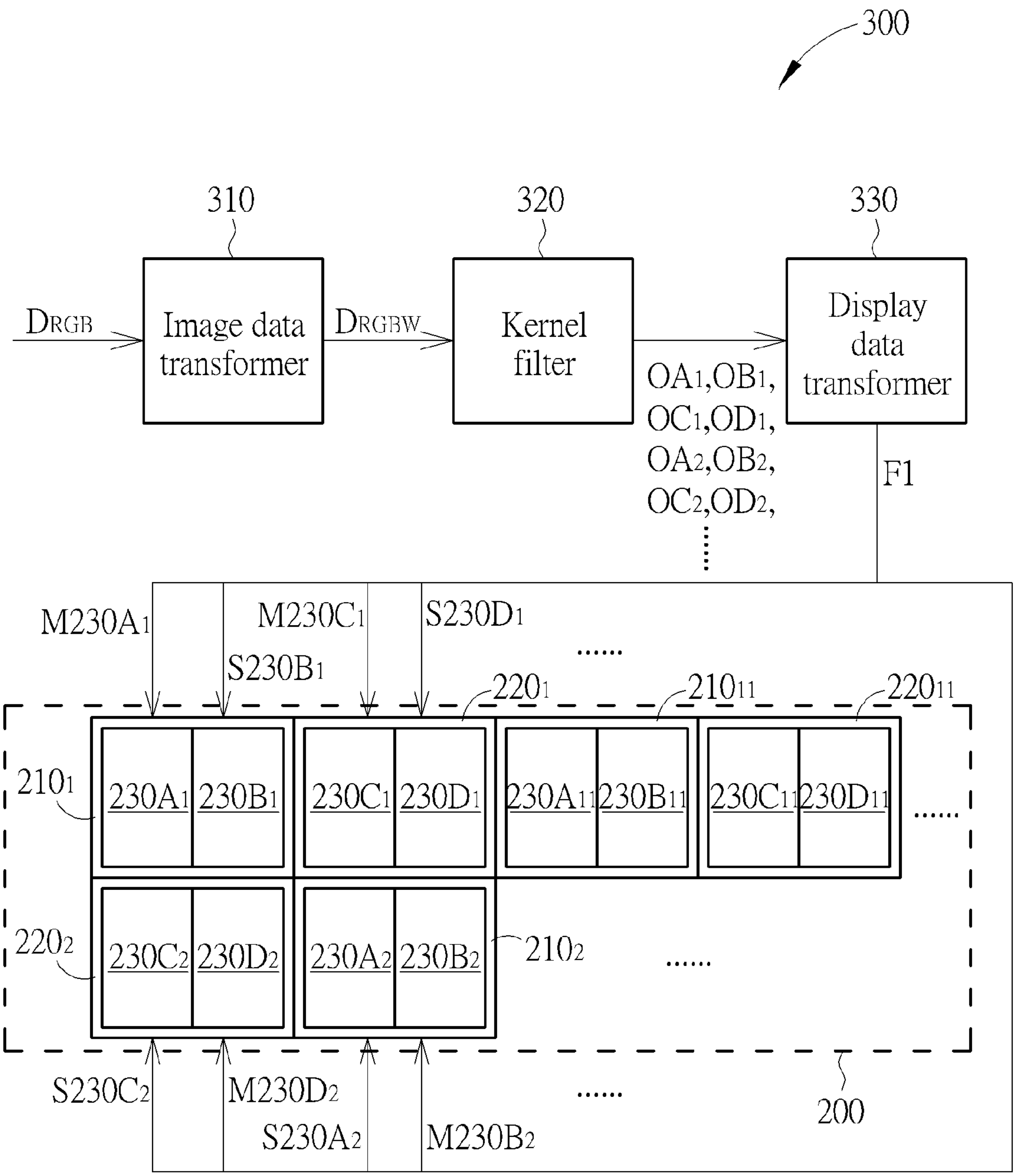
FIG. 3 shows a display according to one embodiment of the present invention.

FIG. 3 shows a display 300 according to one embodiment of the present invention. The display 300 includes a display panel 200, an image data transformer 310, a kernel filter 320 and a display data transformer 330. The sub pixels 230$A_1$, 230$B_1$, 230$C_1$ and 230$D_1$ are sub pixels with four different colors. In some embodiments of the present invention, the sub pixels 230$A_1$, 230$B_1$, 230$C_1$ and 230$D_1$ may be corresponding to red sub pixel, green sub pixel, blue sub pixel and white sub pixel respectively. However, the present invention is not limited to the aforesaid corresponding colors. In other embodiments of the present invention, sub pixels 230$A_1$, 230$B_1$, 230$C_1$ and 230$D_1$ may be corresponding to sub pixels of other colors.

To display the image data on different types of displays, the image data is usually stored in a traditional way with three color image data. The image data transformer 310 may transform the three color image data $D_{RGB}$ required by the traditional display, such as the image data can be displayed by the red sub pixels, the green sub pixels and the blue sub pixels in the display 100, to a four color image data $D_{RGBW}$, such as the image data required by the red sub pixels, the green sub pixels, the blue sub pixels, and the white sub pixels, by color mapping. In some embodiments of the present invention, the three color image data $D_{RGB}$ may be the gray scales or the gamma values displayed by the red sub pixels, the green sub pixels and the blue sub pixels, and the four color image data $D_{RGBW}$ may be the gray scales or the gamma values displayed by the red sub pixels, the green sub pixels, the blue sub pixels and the white (or transparent) sub pixels.

For example, if the grayscales corresponding to a red sub pixel, a green sub pixel and a blue sub pixel of a set in the three color image data $D_{RGB}$ are 20, 60, and 120, then, after transformed by the image data transformed 310, the grayscales for the red color, the green color, the blue color and the white (or transparent) color may be 0, 40, 100, and 20 respectively. That is, in the four color image data $D_{RGBW}$, the grayscale of the white color may be the minimum grayscale, 20 in this case, among the grayscales for the red sub pixel, the green sub pixel and the blue sub pixel. However, in other embodiments of the present invention, the image data transformer 310 may also transform the three color image data $D_{RGB}$ to the four color image data $D_{RGBW}$ according to other mapping relation.

Since the pixels 210$_1$ and 220$_1$ of the display panel 200 only include two sub pixels of different colors respectively, the four color image data $D_{RGBW}$ may pass through the kernel filter 320 to generate at least the original data $OA_1$, $OB_1$, $OC_1$ and $OD_1$ of sub pixels 230$A_1$, 230$B_1$, 230$C_1$, and sub pixel 230$D_1$ disposed in sequence respectively. The sub pixel 230$B_1$ is adjacent to the sub pixel 230$A_1$ and the sub pixel 230$C_1$. The sub pixel 230$C_1$ is adjacent to the sub pixel 230$D_1$. In some embodiments of the present invention, the kernel filter 320 may generate the original data $OA_1$, $OB_1$, $OC_1$ and $OD_1$ of sub pixels 230$A_1$, 230$B_1$, 230$C_1$, and sub pixel 230$D_1$ by calculating weighted averages on image data of neighboring pixels in the four color image data according to a matrix.

Figure 4A:
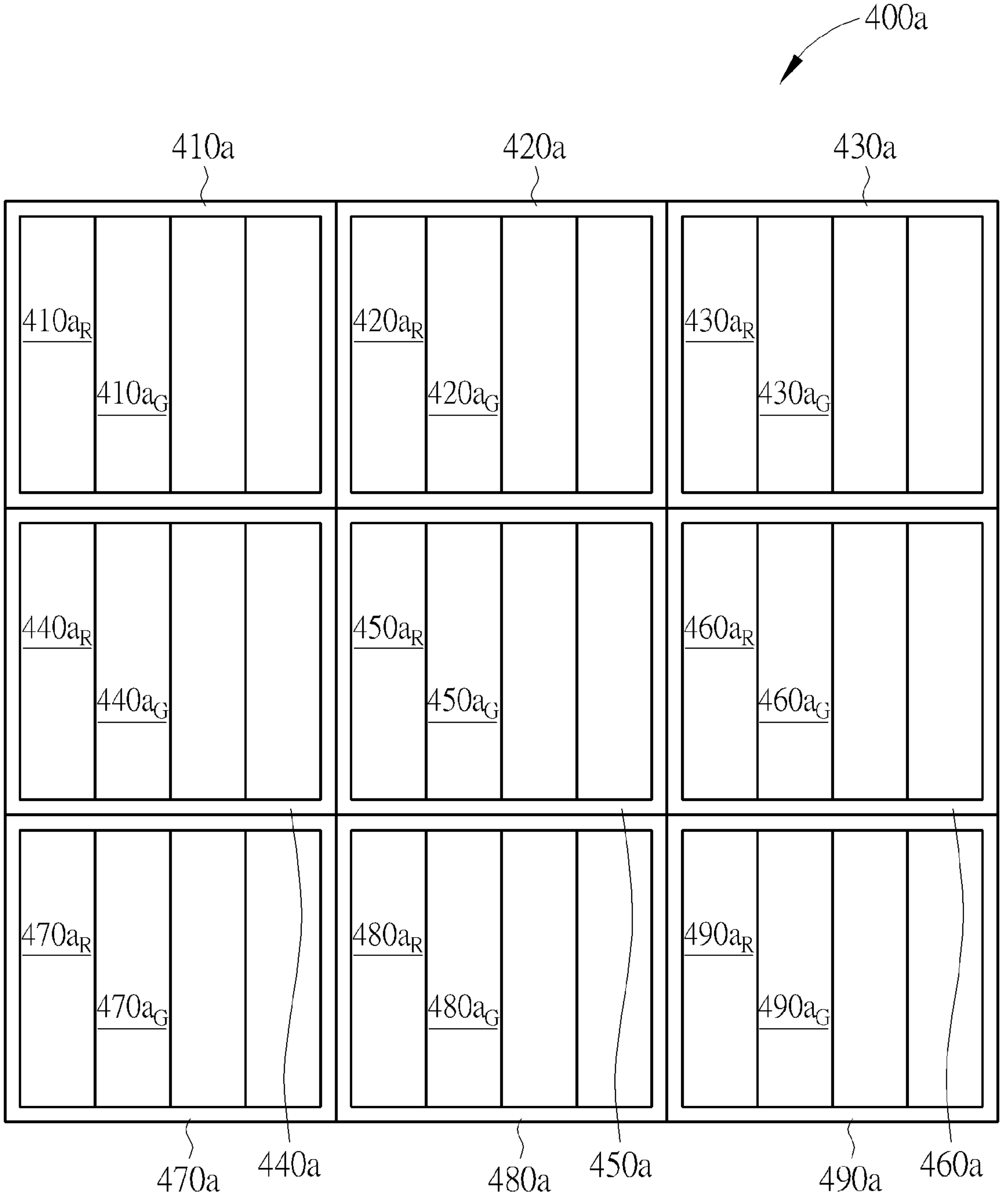
FIG. 4A shows a four color image data according to one embodiment of the present invention.
Figure 4B:
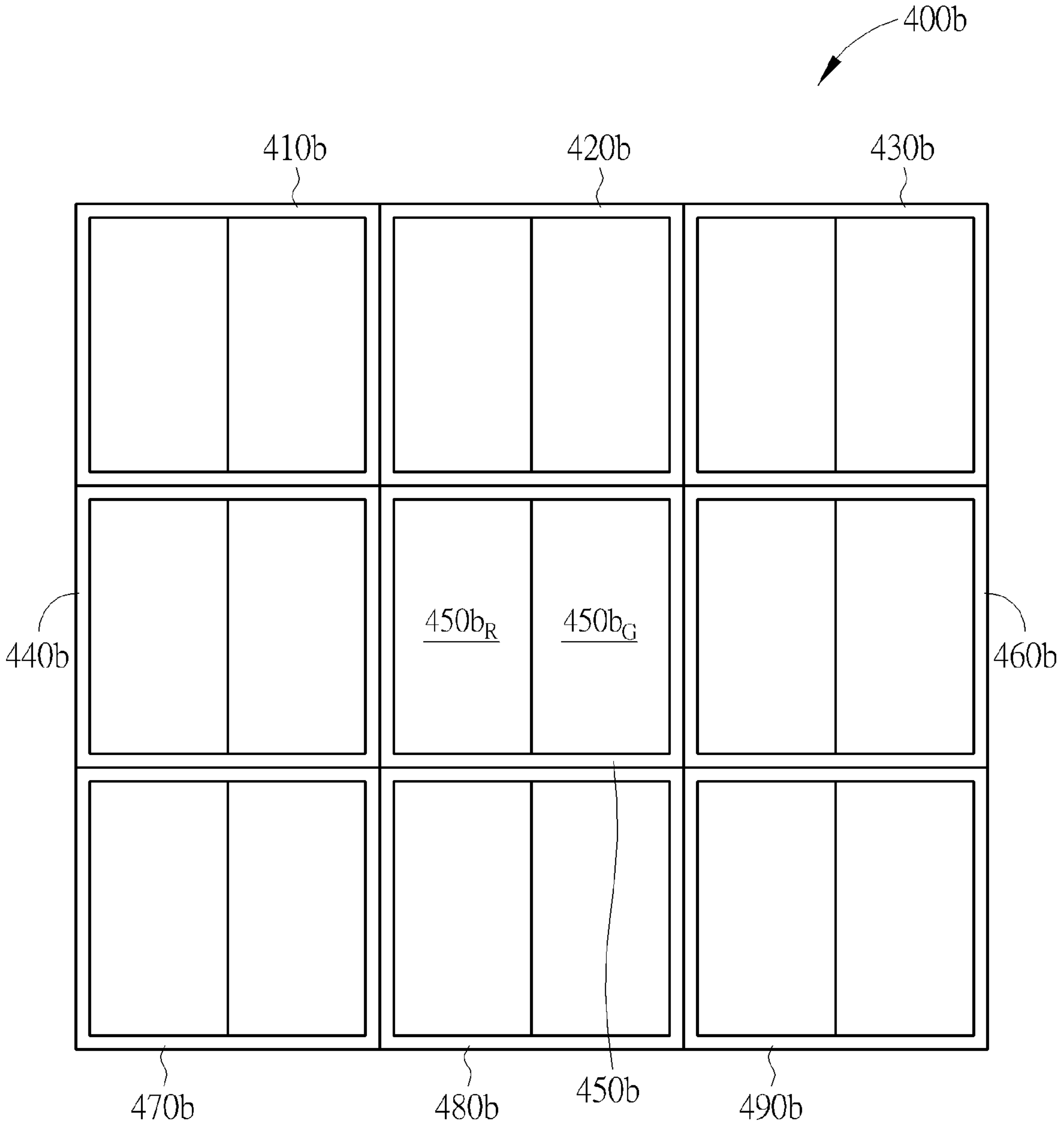
FIG. 4B shows original data of a sub pixel according to one embodiment of the present invention.

FIG. 4A shows a four color image data 400*a* according to one embodiment of the present invention. The four color image data 400*a* may be outputted by the image data transformer 310. FIG. 4B shows original data 400*b* of a sub pixel according to one embodiment of the present invention. In some embodiments of the present invention, the kernel filter 320 may use a matrix K1 to transform the four color image data 400*a* to the original data 400*b* of the sub pixels. The matrix K1 may be for example, but not limited to, represented as $$\begin{bmatrix} 0.1 & 0.1 & 0.1 \\ 0.1 & 0.2 & 0.1 \\ 0.1 & 0.1 & 0.1 \end{bmatrix}.$$

The four color image data 400*a* include nine pixels 410*a* to 490*a* with a center of the pixel 450*a*. Each pixel 410*a* to 490*a* may include image data of four different colors, such as the image data of red color, green color, blue color and white color, respectively. The original data 400*b* of sub pixels may include the original data of pixels 410*b* to 490*b* with the center of the pixel 450*b*. The pixel 450*b* may be corresponding to the pixel 450*a*; however, the pixel 450*b* may include only two sub pixels of different colors, such as a red sub pixel and a green sub pixel. Pixels adjacent to the pixel 450*b* include sub pixels of different colors that are different from the colors of the sub pixels of the pixel 450*b*. For example, the pixel 460*b* may only include blue sub pixel and white sub pixel. In some embodiment of the present invention, the original data 450$b_R$ of the red sub pixel of the pixel 450*b* may be generated by calculating weighted averages on image data 410$a_R$ to 490$a_R$ of the red sub pixels of the pixels 410*a* to 490*a*. That is, the original data 450$b_R$ of the red sub pixel of the pixel 450*b* may be represented as formula (1) as below:

$$450b_R=(0.1\times 410a_R)+(0.1\times 420a_R)+(0.1\times 430a_R)+(0.1\times 440a_R)+(0.2\times 450a_R)+(0.1\times 460a_R)+(0.1\times 470a_R)+(0.1\times 480a_R)+(0.1\times 490a_R) \quad \text{Formula (1):}$$

Similarly, the original data 450$b_G$ of the green sub pixel of the pixel 450*b* may be generated by calculating weighted averages on image data 410$a_G$ to 490$a_G$ of the green sub pixels of the pixels 410*a* to 490*a*. That is, the original data 450$b_G$ of the green sub pixel of the pixel 450*b* may be represented as formula (2) as below:

$$450b_G=(0.1\times 410a_G)+(0.1\times 420a_G)+(0.1\times 430a_G)+(0.1\times 440a_G)+(0.2\times 450a_G)+(0.1\times 460a_G)+(0.1\times 470a_G)+(0.1\times 480a_G)+(0.1\times 490a_G) \quad \text{Formula (2):}$$

In some embodiments of the present invention, the kernel filter 320 may generate the original data $OA_1$, $OB_1$, $OC_1$ and $OD_1$ of the sub pixels 230$A_1$, 230$B_1$, 230$C_1$ and 230$D_1$ of the display panel 200 according to the aforesaid method used to generate the original data 450$b_R$ and 450$b_G$ of the red sub pixel and the green sub pixel of the pixel 450*b*. However, the present invention is not limited to apply the aforesaid method to generate original data of sub pixels. In other embodiments of the present invention, the kernel filter 320 may also use a matrix of different size and/or different weighting.

The display data transformer 330 may further transform the original data $OA_1$, $OB_1$, $OC_1$ and $OD_1$ of the sub pixels 230$A_1$, 230$B_1$, 230$C_1$ and 230$D_1$ to generate the first display data of the sub pixels 230$A_1$, 230$B_1$, 230$C_1$ and 230$D_1$. In some embodiments of the present invention, the display data transformer 330 may transform the original data $OA_1$, $OB_1$, $OC_1$ and $OD_1$ of the sub pixels 230$A_1$, 230$B_1$, 230$C_1$ and 230$D_1$ to generate the first display data M230$A_1$, S230$B_1$, M230$C_1$ and S230$D_1$ of the sub pixels 230$A_1$, 230$B_1$, 230$C_1$ and 230$D_1$ according to a characteristic table of color shift and viewing angle of the display panel 200.

Table 1 shows part of the characteristic table of color shift and viewing angle of the display panel 200.

TABLE 1

| Original data | First characteristic value | Second characteristic value |
|---|---|---|
| 32 | 74 | 15 |
| 64 | 105 | 32 |
| 96 | 123 | 79 |
| 128 | 128 | 128 |

In some embodiments of the present invention, the characteristic table of color shift and viewing angle may use two sub tables to store the relation between the original data and the first characteristic values and the relation between the original data and the second characteristic values respectively. The first column in Table 1 stores the original data, which is represented as grayscale in this case. The second and the third columns of Table 1 store the first characteristic values and the second characteristic values corresponding to the grayscales of the original data in the first column respectively. In some embodiments of the present invention, to avoid the image quality from being affected by a viewing angle of the user, the characteristic table of color shift and viewing angle may map the brightness of the grayscale to two characteristic values according to the characteristic of viewing angle of the brightness of each of the grayscale. Therefore, the characteristic table of color shift and viewing angle of the display panel 200 may have different corresponding relations between the grayscale of the original data, the first characteristic values and the second characteristic values as the characteristics of display panel 200 varies. In addition, in other embodiments of the present invention, the characteristic table of color shift and viewing angle of the display panel 200 may use the gamma value to represent the original data, the first characteristic value, and the second characteristic value. In some embodiments of the present invention, a first characteristic value corresponding to a grayscale value may be substaintially greater or equal to a second characteristic value corresponding to the same grayscale, and the second characteristic value corresponding to the same grayscale may be substaintially smaller or equal to the grayscale.

The display data transformer 330 may generate the first display data M230$A_1$ and M230$C_1$ of the sub pixels 230$A_1$ and 230$C_1$ according to the first characteristic values corresponding to the grayscales of the original data of the sub pixels stored in the characteristic table of color shift and viewing angle. Also, the display data transformer 330 may generate the first display data S230$B_1$ and S230$D_1$ of the sub pixels 230$B_1$ and 230$D_1$ according to the second characteristic values corresponding to the grayscales of the original data of the sub pixels stored in the characteristic table of color shift and viewing angle. For example, if the grayscale of the original data $OA_1$ of the sub pixel 230$A_1$ is 32, the first display data M230$A_1$ of the sub pixel 230$A_1$ may by adjusted to about 74. If the grayscale of the original data $OB_1$ of the sub pixel 230$B_1$ is 64, the first display data S230$B_1$ of the sub pixel 230$B_1$ may by adjusted to about 32. Therefore, in the embodiment of FIG. 3, the brightness of the first display data M230$A_1$ of the sub pixel 230$A_1$ (that is, the brightness of the grayscale or gamma value displayed on the display panel) is substaintially greater than the brightness of the original data $OA_1$ of the sub pixel 230$A_1$, the brightness of the first display data S230$B_1$ of the sub pixel 230$B_1$ is substaintially smaller than the brightness of the original data $OB_1$ of the sub pixel 230$B_1$, the brightness of the first display data M230$C_1$ of the sub pixel 230$C_1$ is substaintially greater than the brightness of the original data $OC_1$ of the sub pixel 230$C_1$, and the brightness of the first display data S230$D_1$ of the sub pixel 230$D_1$ is substaintially smaller than the brightness of the original data $OD_1$ of the sub pixel 230$D_1$.

In some embodiments of the present invention, the display data transformer 330 may generate two types of display data of the sub pixels 230$A_1$, 230$B_1$, 230$C_1$ and 230$D_1$ according to the first characteristic values and the second characteristic values corresponding to the grayscales of the original data of the sub pixels 230$A_1$, 230$B_1$, 230$C_1$ and 230$D_1$ stored in the characteristic table of color shift and viewing angle firstly, and then select the proper display data from the two types of display data as the first display data of the 230$A_1$, 230$B_1$, 230$C_1$ and 230$D_1$ by a switch. However, the present invention is not limited to select the first display data by a switch.

Although, the data image transformer 330 may look up the first characteristic values and the second characteristics values of sub pixels with different colors in Table 1 in the aforesaid embodiments, in other embodiments, the display data of sub pixels with different colors may be generated from the original data of the sub pixels according to first characteristic values and second characteristic values with different corresponding relations. In other words, the characteristic table of color shift and viewing angle may store the relations between the first characteristic values and the original data for different colors and the relations between the second characteristic values and the original data for different colors so that the display data transformer 330 may generate the display data of each sub pixels according to the colors of the sub pixels and the corresponding characteristic values stored in the characteristic table of color shift and viewing angle.

After the display data transformer 330 generates the first display data M230$A_1$, S230$B_1$, M230$C_1$, and S230$D_1$ of the sub pixels 230$A_1$, 230$B_1$, 230$C_1$ and 230$D_1$, the display 300 may display a first frame of image F1 on the display panel 200 according to the first display data M230$A_1$, S230$B_1$, M230$C_1$, and S230$D_1$ of the sub pixels 230$A_1$, 230$B_1$, 230$C_1$ and 230$D_1$.

Due to the display data transformer 330 of the display 300, the brightness of the first display data M230$A_1$ and S230$B_1$ of the adjacent sub pixels 230$A_1$ and 230$B_1$ are substaintially greater and substaintially smaller than the original data $OA_1$ and $OB_1$ respectively, and the brightness of the first display data M230$C_1$ and S230$D_1$ of the adjacent sub pixels 230$C_1$ and 230$D_1$ are substaintially greater and substaintially smaller than the original data $OC_1$ and $OD_1$ respectively. Consequently, the issue of color shift caused by different viewing angles of the users in the prior art can be solved.

Figure 5:
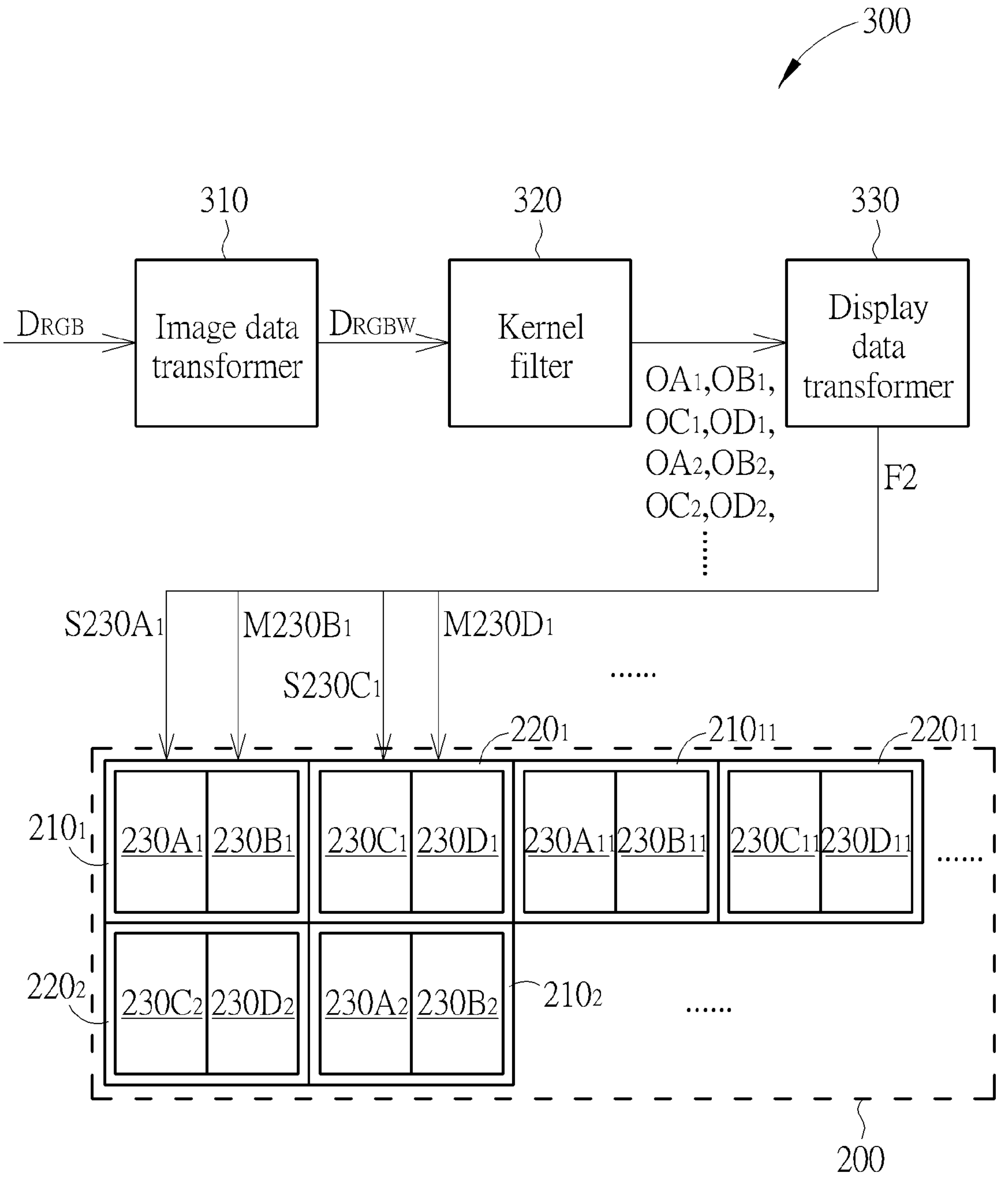
FIG. 5 shows another operation of the display in FIG. 3.

In some embodiments of the present invention, the display data transformer 330 may not only generate the first display data M230$A_1$, S230$B_1$, M230$C_1$, and S230$D_1$ of the sub pixels 230$A_1$, 230$B_1$, 230$C_1$ and 230$D_1$ according to the characteristic table of color shift and viewing angle of the display panel 200, but also generate second display data of the sub pixels 230$A_1$, 230$B_1$, 230$C_1$ and 230$D_1$ according to the characteristic table of color shift and viewing angle of the display panel 200. In FIG. 5, the display data transformer 330 may generate the second display data S230$A_1$ and S230$C_1$ of the sub pixels 230$A_1$ and 230$C_1$ according to the second characteristic values corresponding to the grayscales of the sub pixels 230$A_1$ and 230$C_1$ stored in the characteristic table of color shift and viewing angle, and may generate the second display data M230$B_1$ and M230$D_1$ of the sub pixels 230$B_1$ and 230$D_1$ according to the first characteristic values corresponding to the grayscales sub pixels 230$B_1$ and 230$D_1$ stored in the characteristic table of color shift and viewing angle. A brightness of the second display data S230$A_1$ of the sub pixel 230$A_1$ is substaintially smaller than the brightness of the original data of the sub pixel 230$A_1$, a brightness of the second display data M230$B_1$ of the sub pixel 230$B_1$ is substaintially greater than the brightness of the original data of the sub pixel 230$B_1$, a brightness of the second display data S230$C_1$ of the sub pixel 230$C_1$ is substaintially smaller than the brightness of the original data of the sub pixel 230$C_1$, and a brightness of the second display data M230$D_1$ of the sub pixel 230$D_1$ is substaintially greater than the brightness of the original data of the sub pixel 230$D_1$.

Consequently, after displaying the first frame of image F1 according to the first display data M230$A_1$, S230$B_1$, M230$C_1$, and S230$D_1$ of the sub pixels 230$A_1$, 230$B_1$, 230$C_1$ and 230$D_1$, the display panel 200 may further display a second frame of image F2 according to the second display data S230$A_1$, M230$B_1$, S230$C_1$, and M230$D_1$ of the sub pixels 230$A_1$, 230$B_1$, 230$C_1$ and 230$D_1$. Namely, in some embodiments of the present invention, the display 300 may display the first frame of image F1 and the second frame of image F2 on the display panel 200 successively during a frame period. Since the first display data M230$A_1$, S230$B_1$, M230$C_1$, and S230$D_1$ of the sub pixels 230$A_1$, 230$B_1$, 230$C_1$ and 230$D_1$ and the second display data S230$A_1$, M230$B_1$, S230$C_1$, and M230$D_1$ of the sub pixels 230$A_1$, 230$B_1$, 230$C_1$ and 230$D_1$ are generated according to different types of characteristic values in the characteristic table of color shift and viewing angle, the issue of low image quality caused by a pixel for displaying with fixed brightness that is substaintially greater or substaintially smaller than the brightness than its original data for a long time can be solved.

In some embodiments of the present invention, the display data transformer 330 may generate the first and the second display data of the sub pixels 230$A_1$, 230$B_1$, 230$C_1$ and 230$D_1$ according to the first and the second characteristic values corresponding to the original data $OA_1$, $OB_1$, $OC_1$ and $OD_1$ of the sub pixels 230$A_1$, 230$B_1$, 230$C_1$ and 230$D_1$ in the characteristic table of color shift and viewing angle firstly, and then choose the proper display data for being displayed in a proper time frame as to generate the first and the second display data of the sub pixels 230$A_1$, 230$B_1$, 230$C_1$ and 230$D_1$ by the switch. However, the present invention is not limited to the aforesaid processing order.

In some embodiments of the present invention, the sub pixels 230$A_1$, 230$B_1$, 230$C_1$ and 230$D_1$ may be sub pixels disposed in a row, however, in other embodiments of the present invention, the sub pixels 230$A_1$, 230$B_1$, 230$C_1$ and 230$D_1$ may be sub pixels disposed in a column.

In some embodiments of the present invention, after the four color image data $D_{RGBW}$ passing through the kernel filter 320, original data $OA_2$, $OB_2$, $OC_2$ and $OD_2$ of the sub pixels 230$A_2$, 230$B_2$, 230$C_2$ and 230$D_2$ that are disposed in sequence on the display panel 200 may also be generated. The sub pixel 230$C_2$ is adjacent to the sub pixel 230$A_1$. The sub pixel 230$D_2$ is adjacent to the sub pixel 230$B_1$, the sub pixel 230$C_2$ and the sub pixel 230$A_2$. The sub pixel 230$A_2$ is adjacent to the sub pixel 230$C_1$ and the sub pixel 230$B_2$. The sub pixel 230$B_2$ is adjacent to the sub pixel 230$D_1$.

The display data transformer 330 may generate the first display data S230$C_2$ and S230$A_2$ of the sub pixels 230$C_2$ and 230$A_2$ according to the second characteristic values corresponding to the original data of the sub pixels 230$C_2$ and 230$A_2$ in the characteristic table of color shift and viewing angle, and generate the first display data M230$D_2$ and M230$B_2$ of the sub pixels 230$D_2$ and 230$B_2$ according to the first characteristic values corresponding to the original data of the sub pixels 230$D_2$ and 230$B_2$ in the characteristic table of color shift and viewing angle. In some embodiments of the present invention, a brightness of the first display data S230$C_2$ of the sub pixel 230$C_2$ is substaintially smaller than a brightness of the original data $OC_2$ of the sub pixel 230$C_2$, a brightness of the first display data M230$D_2$ of the sub pixel 230$D_2$ is substaintially greater than a brightness of the original data $OD_2$ of the sub pixel 230$D_2$, a brightness of the first display data S230$A_2$ of the sub pixel 230$A_2$ is substaintially smaller than a brightness of the original data $OA_2$ of the sub pixel 230$A_2$, and a brightness of the first display data M230$B_2$ of the sub pixel 230$B_2$ is substaintially greater than a brightness of the original data $OB_2$ of the sub pixel 230$B_2$.

In some embodiments of the present invention, if the sub pixels 230$A_1$ and 230$A_2$ have the same original data, for example, both of the sub pixels have the grayscale of the original data to be 96, then according to Table 1, the grayscale of the first display data M230$A_1$ of the sub pixel 230$A_1$ may be adjusted to 123, and the grayscale of the first display data S230$A_2$ of the sub pixel 230$A_2$ may be adjusted to 79. Therefore, a brightness of the first display data M230$A_1$ of the sub pixel 230$A_1$ is substaintially greater than the original data $OA_1$ of the sub pixel 230$A_1$, which has grayscale of 96, and the brightness of the first display data M230$A_1$ of the sub pixel 230$A_1$ is substaintially greater than a brightness of the first display data S230$A_2$ of the sub pixel 230$A_2$.

After the display data transformer 330 may generate first display data M230$A_1$, S230$B_1$, M230$C_1$, S230$D_1$, S230$C_2$, M230$D_2$, S230$A_2$, M230$B_2$ of the sub pixels 230$A_1$, 230$B_1$, 230$C_1$, 230$D_1$, 230$C_2$, 230$D_2$, 230$A_2$, 230$B_2$, the display 300 may display the first frame of image F1 on the display panel 200 according to the first display data M230$A_1$, S230$B_1$, M230$C_1$, S230$D_1$, S230$C_2$, M230$D_2$, S230$A_2$, M230$B_2$ of the sub pixels 230$A_1$, 230$B_1$, 230$C_1$, 230$D_1$, 230$C_2$, 230$D_2$, 230$A_2$, 230$B_2$. In other words, the display 300 may generate the display data of the adjacent sub pixels in the display panel 200 according to different types of characteristic values in the characteristic table of color shift and viewing angle.

In some embodiments of the present invention, the image displayed by the four color image data $D_{RGBW}$ may include edges of objects, such as the edge between an object in the front and an object in the background. If a sub pixel 230$A_3$ is a sub pixel generated from an edge of the four color image data $D_{RGBW}$ by the kernel filter 320, then the display 300 may display the original data $OA_3$ of the sub pixel 230$A_3$ on the display panel 200 directly without using the display data transformer 330 to generate other display data of the sub pixel 230A. Consequently, the issue of edge blur caused by the sub pixels corresponding to the edges in the four color image data $D_{RGBW}$ being transformed to display different brightness can be solved. In some embodiments of the present invention, the display data transformer 330 may generate the two kinds of display data of the sub pixel 230$A_3$ according to the first and the second characteristic values corresponding to the original data $OA_3$ of the sub pixel 230$A_3$ in the characteristic table of color shift and viewing angle firstly, and then choose one of the data among the two kinds of display data and the original data of the sub pixel 230$A_3$ to display by using the switch.

Figure 6:
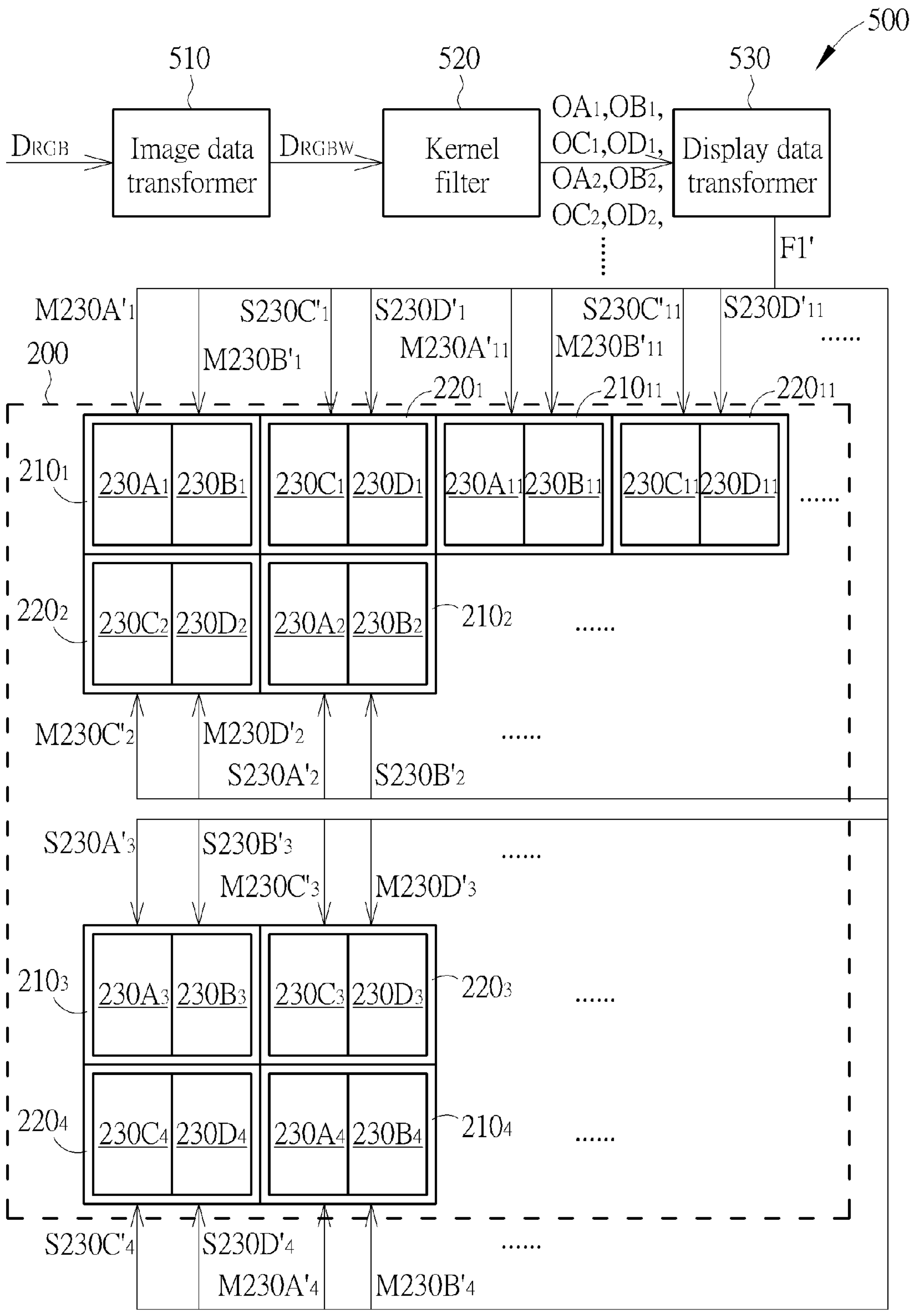
FIG. 6 shows a display according to another embodiment of the present invention.

Although in the embodiments in FIG. 3, the display data of each sub pixel may be generated according to the characteristic values in the characteristic table of color shift and viewing angle that is different from the characteristic values selected by its adjacent sub pixels, the present invention is not limited to the aforesaid embodiments. FIG. 6 shows a display 500 according another embodiment of the present invention. The display 500 includes the display panel 200, an image data transformer 510, a kernel filter 520 and a display data transformer 530. The difference between the displays 500 and 300 is in that the display data transformer 530 may generate the first display data M230$A'_1$, M230$B'_1$, M230$C'_2$, and M230$D'_2$ of the four pixels 230$A_1$, 230$B_1$, 230$C_2$ and 230$D_2$ that are adjacent vertically (respectively disposed in two adjacent rows) according to the first characteristic values in the characteristic table of color shift and viewing angle, and may generate the first display data S230$C'_1$, S230$D'_1$, S230$A'_2$, and S230$B'_2$ of the four pixels 230$C_1$, 230$D_1$, 230$A_2$ and 230$B_2$ that are adjacent vertically (respectively disposed in two adjacent rows) according to the second characteristic values in the characteristic table of color shift and viewing angle. Therefore, in the embodiment in FIG. 6, the brightness of the first display data M230$A'_1$ of the sub pixel 230$A_1$ is substaintially greater than the original data $OA_1$ of the sub pixel 230$A_1$, the brightness of the first display data M230$B'_1$ of the sub pixel 230$B_1$ is substaintially greater than the original data $OB_1$ of the sub pixel 230$B_1$, the brightness of the first display data M230$C'_2$ of the sub pixel 230$C_2$ is substaintially greater than the original data $OC_2$ of the sub pixel 230$C_2$, the brightness of the first display data M230$D'_2$ of the sub pixel 230$D_2$ is substaintially greater than the original data $OD_2$ of the sub pixel 230$D_2$, the brightness of the first display data S230$C'_1$ of the sub pixel 230$C_1$ is substaintially smaller than the original data $OC_1$ of the sub pixel 230$C_1$, the brightness of the first display data S230$D'_1$ of the sub pixel 230$D_1$ is substaintially smaller than the original data $OD_1$ of the sub pixel 230$D_1$, the brightness of the first display data S230$A'_2$ of the sub pixel 230$A_2$ is substaintially smaller than the original data $OA_2$ of the sub pixel 230$A_2$, and the brightness of the first display data S230$B'_2$ of the sub pixel 230$B_2$ is substaintially smaller than the original data $OB_2$ of the sub pixel 230$B_2$. That is, in the embodiments in FIG. 5, the display data of the two sub pixels in the same pixel can be generated according to the same column of characteristic values in the characteristic table of color shift and viewing angle of the display. For example, the display data of both of the two sub pixels in the same pixel can be generated according to the first characteristic values corresponding to the original data of the two sub pixels or the second characteristic values corresponding to the original data of the two sub pixels. Also, the display data of the sub pixels in two adjacent pixels disposed in the same row can be generated according to the different columns of characteristic values in the characteristic table of color shift and viewing angle of the display. For example, the display data of the sub pixels in two adjacent pixels in the same row can be generated according to the first characteristic value and the second characteristic value corresponding to the original data of the two sub pixels respectively, or the second characteristic value and the first characteristic value corresponding to the original data of the two sub pixels respectively. In other words, in some embodiments of the present invention, the pixels $210_1$, $220_1$, $210_{11}$ and $220_{11}$ are disposed in the same row, the pixel $210_{11}$ has sub pixels 230$A_{11}$ and 230$B_{11}$ with two different colors, the pixel $220_{11}$ has sub pixels 230$C_{11}$ and 230$D_{11}$ with two different colors and the sub pixel 230$A_{11}$ is right adjacent of the sub pixel 230$D_1$; therefore, the display data transformer 530 may generate the first display data M230$A'_{11}$ and M230$B'_{11}$ of the sub pixels 230$A_{11}$ and 230$B_{11}$ of two different colors according to the first characteristic values corresponding to the original data of the sub pixels 230$A_{11}$ and 230$B_{11}$ in the characteristic table of color shift and viewing angle of the display, and may generate the first display data S230$C'_{11}$ and S230$D'_{11}$ of the sub pixels 230$C_{11}$ and 230$D_{11}$ of two different colors according to the second characteristic values corresponding to the original data of the sub pixels 230$C_{11}$ and 230$D_{11}$ in the characteristic table of color shift and viewing angle of the display.

In the embodiment in FIG. 6, the display data transformer 530 may further generate the first display data of sub pixels 230$A_3$, 230$B_3$, 230$C_3$, 230$D_3$, 230$C_4$, 230$D_4$, 230$A_4$, and 230$B_4$. In display panel 200, the sub pixels 230$A_3$, 230$B_3$, 230$C_3$, and 230$D_3$ are disposed in a same row, the sub pixels 230$C_4$, 230$D_4$, 230$A_4$, and 230$B_4$ are disposed in a same row next to the sub pixels 230$A_3$, 230$B_3$, 230$C_3$, and 230$D_3$, and the sub pixels 230$C_2$, 230$D_2$, 230$A_2$, and 230$B_2$ are disposed in a same row prior to the sub pixels 230$A_3$, 230$B_3$, 230$C_3$, and 230$D_3$. In some embodiments of the present invention, the display data of the sub pixels 230$C_2$ and 230$D_2$ that are adjacent to the sub pixels 230$A_3$ and 230$B_3$ and the display data of the sub pixels 230$C_4$ and 230$D_4$ that are adjacent to the sub pixels 230$A_3$ and 230$B_3$ may be generated according to different types of characteristic values in the characteristic table of color shift and viewing angle, and the display data of the sub pixels 230$A_1$ and 230$B_1$ that are adjacent to the sub pixels 230$C_2$ and 230$D_2$ and the display data of the sub pixels 230$A_3$ and 230$B_3$ that are adjacent to the sub pixels 230$C_2$ and 230$D_2$ may be generated according to different types of characteristic values in the characteristic table of color shift and viewing angle. In other words, the display data transformer 530 may generate the first display data M230C'$_3$, M230D'$_3$, M230A'$_4$, and M230B'$_4$ of the sub pixels 230$C_3$, 230$D_3$, 230$A_4$, and 230$B_4$ according to the first characteristic values corresponding to their original data in the characteristic table of color shift and viewing angle, and may generate the first display data S230A'$_3$, S230B'$_3$, S230C'$_4$, and S230D'$_4$ of the sub pixels 230$A_3$, 230$B_3$, 230$C_4$, and 230$D_4$ according to the second characteristic values corresponding to their original data in the characteristic table of color shift and viewing angle.

Figure 7:
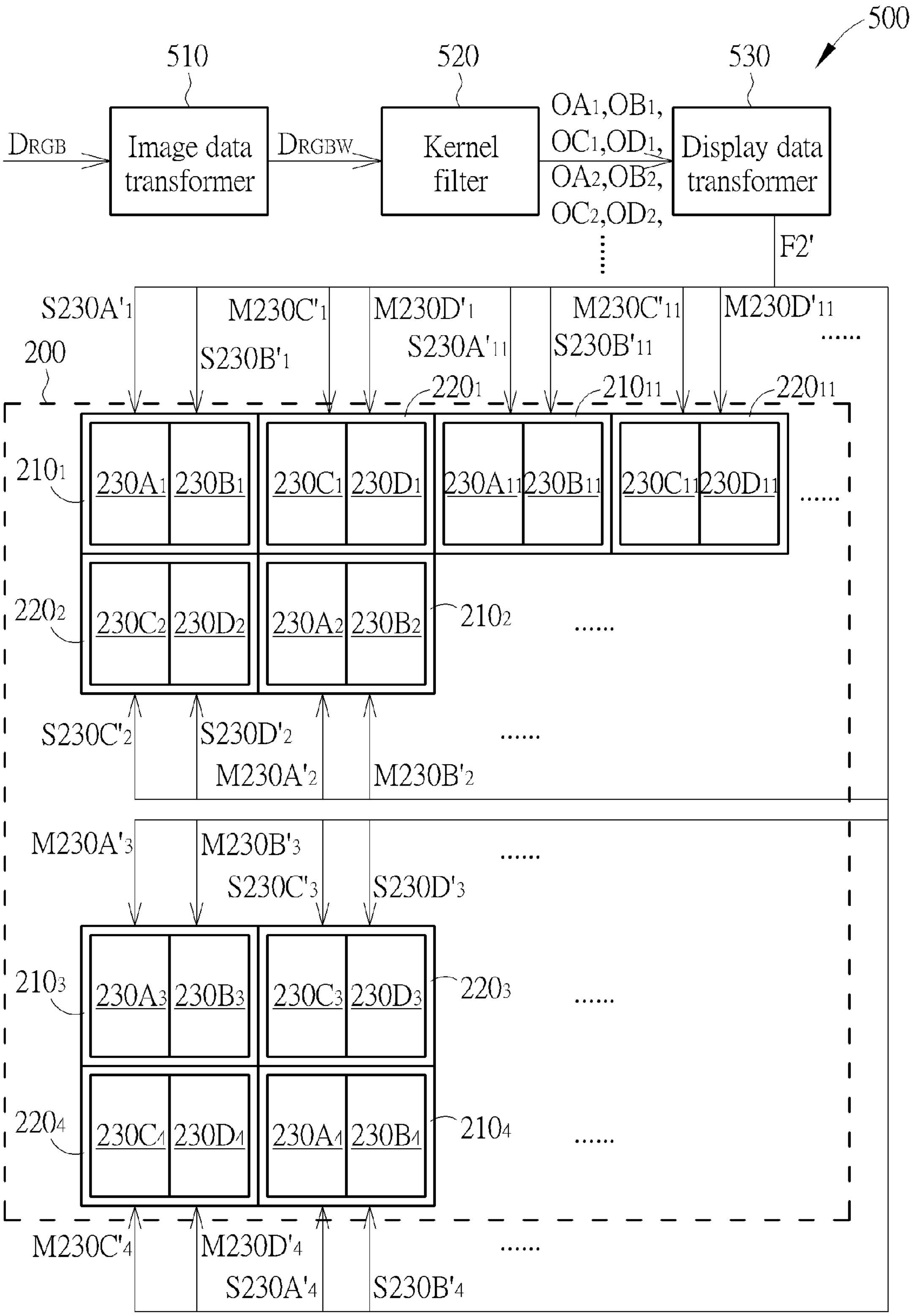
FIG. 7 shows another operation of the display in FIG. 6.

In some embodiments of the present invention, the display data transformer 530 may not only generate the first display data M230A'$_1$, M230B'$_1$, S230C'$_1$, S230D'$_1$, M230C'$_2$, M230D'$_2$, S230A'$_2$, S230B'$_2$, S230A'$_3$, S230B'$_3$, M230C'$_3$, M230D'$_3$, S230C'$_4$, S230D'$_4$, M230A'$_4$ and M230B'$_4$ of the sub pixels 230$A_1$, 230$B_1$, 230$C_1$, 230$D_1$, 230$C_2$, 230$D_2$, 230$A_2$, 230$B_2$, 230$A_3$, 230$B_3$, 230$C_3$, 230$D_3$, 230$C_4$, 230$D_4$, 230$A_4$ and 230$B_4$ according to the characteristic table of color shift and viewing angle of the display panel 200, but also generate the second display data of the sub pixels 230$A_1$, 230$B_1$, 230$C_1$, 230$D_1$, 230$C_2$, 230$D_2$, 230$A_2$, 230$B_2$, 230$A_3$, 230$B_3$, 230$C_3$, 230$D_3$, 230$C_4$, 230$D_4$, 230$A_4$ and 230$B_4$ according to the characteristic table of color shift and viewing angle of the display panel 200. In the embodiment in FIG. 7, the display data transformer 530 may generate the second display data S230A'$_1$, S230B'$_1$, S230C'$_2$, S230D'$_2$, S230C'$_3$, S230D'$_3$, S230A'$_4$ and S230B'$_4$ of the sub pixels 230$A_1$, 230$B_1$, 230$C_2$, 230$D_2$, 230$C_3$, 230$D_3$, 230$A_4$ and 230$B_4$ according to the second characteristic values corresponding to the original data of the sub pixels in the characteristic table of color shift and viewing angle of the display panel, and generate the second display data M230C'$_1$, M230D'$_1$, M230A'$_2$, M230B'$_2$, M230A'$_3$, M230B'$_3$, M230C'$_4$ and M230D'$_4$ of the sub pixels 230$C_1$, 230$D_1$, 230$A_2$, 230$B_2$, 230$A_3$, 230$B_3$, 230$C_4$ and 230$D_4$ according to the first characteristic values corresponding to the original data of the sub pixels in the characteristic table of color shift and viewing angle of the display panel.

Consequently, after the display panel 200 displays the first frame of image F1' according to the first display data M230A'$_1$, M230B'$_1$, S230C'$_1$, S230D'$_1$, M230C'$_2$, M230D'$_2$, S230A'$_2$, S230B'$_2$, S230A'$_3$, S230B'$_3$, M230C'$_3$, M230D'$_3$, S230C'$_4$, S230D'$_4$, M230A'$_4$ and M230B'$_4$ of the sub pixels 230$A_1$, 230$B_1$, 230$C_1$, 230$D_1$, 230$C_2$, 230$D_2$, 230$A_2$, 230$B_2$, 230$A_3$, 230$B_3$, 230$C_3$, 230$D_3$, 230$C_4$, 230$D_4$, 230$A_4$ and 230$B_4$, the display panel 200 may further display a second frame of image F2' according to the second display data S230A'$_1$, S230B'$_1$, M230C'$_1$, M230D'$_1$, S230C'$_2$, S230D'$_2$, M230A'$_2$, M230B'$_2$, M230A'$_3$, M230B'$_3$, S230C'$_3$, S230D'$_3$, M230C'$_4$, M230D'$_4$, S230A'$_4$ and S230B'$_4$ of the sub pixels 230$A_1$, 230$B_1$, 230$C_1$, 230$D_1$, 230$C_2$, 230$D_2$, 230$A_2$, 230$B_2$, 230$A_3$, 230$B_3$, 230$C_3$, 230$D_3$, 230$C_4$, 230$D_4$, 230$A_4$ and 230$B_4$. That is, in some embodiments of the present invention, the display 500 may display the first frame of image F1' and the second frame of image F2' on the display panel 200 successively during a frame period. Since the first display data and the second display data of the sub pixels 230$A_1$, 230$B_1$, 230$C_1$, 230$D_1$, 230$C_2$, 230$D_2$, 230$A_2$, 230$B_2$, 230$A_3$, 230$B_3$, 230$C_3$, 230$D_3$, 230$C_4$, 230$D_4$, 230$A_4$ and 230$B_4$ are generated according to different types of characteristic values in the characteristic table of color shift and viewing angle, the issue of low image quality caused by a pixel for displaying with fixed brightness that is substaintially greater or substaintially smaller than the brightness than its original data for a long time can be solved.

In the embodiments of FIGS. 3 and 6, the displays 300 and 500 process the display data transformation after passing the four color image data $D_{RGBW}$ through kernel filter so that the complicated computation of the kernel filter can be saved. However, the present invention is not limited to this processing order. In other embodiments of the present invention, the four color image data can be firstly transformed by the display data transformer and then passed through the kernel filter so that the display data generated by the display data transformer may be displayed even more smoothly.

Figure 8:
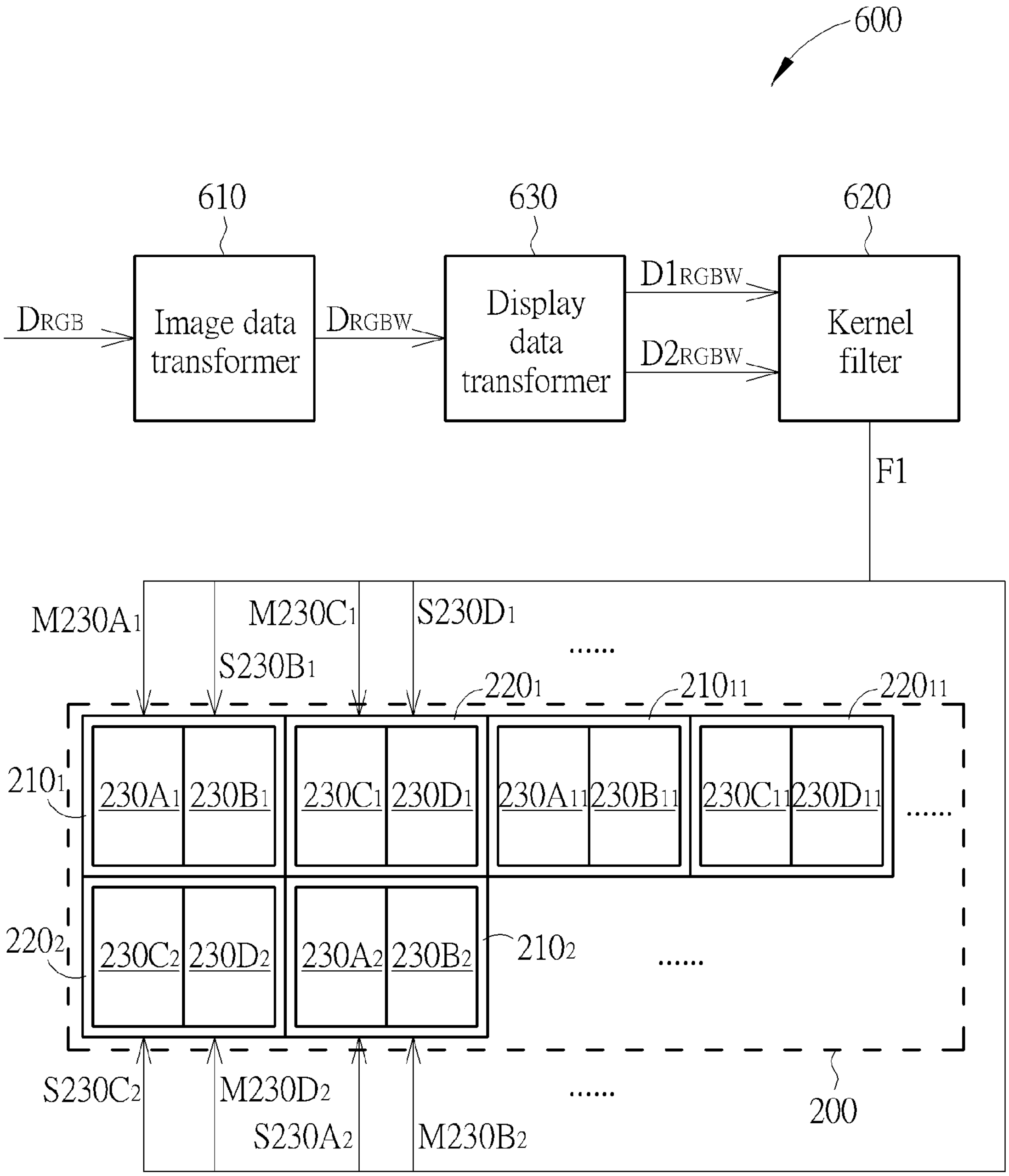
FIG. 8 shows a display according to another embodiment of the present invention.

FIG. 8 shows a display 600 according to one embodiment of the present invention. The display 600 includes the display panel 200, an image data transformer 610, a kernel filter 620 and a display data transformer 630.

The image data transformer 610 may transform the three color image data $D_{RGB}$ to the four color image $D_{RGBW}$, and the image data transformer 610 may transform the four color image data $D_{RGBW}$ to generate a first four color image data $\mathbf{D1}_{RGBW}$ and a second four color image data $\mathbf{D2}_{RGBW}$. In some embodiments of the present invention, the display data transformer 630 may generate the first four color image data $\mathbf{D1}_{RGBW}$ according to the first characteristic values corresponding to each of the grayscales in the four color image data $D_{RGBW}$ in the characteristic table of color shift and viewing angle of the display panel 200 (ex., Table 1), and generate the second four color image data $\mathbf{D2}_{RGBW}$ according to the second characteristic values corresponding to each of the grayscale in the four color image data $D_{RGBW}$ in the characteristic table of color shift and viewing angle of the display panel 200. Therefore, if a grayscale for a red color of a pixel X in the four color image data $D_{RGBW}$ is 96, then, after transformed by the display data transformer 630, a grayscale for the red color in the first four color image data $\mathbf{D1}_{RGBW}$ corresponding to the grayscale for the red color of the pixel X in the four color image data $D_{RGBW}$ would be 123 (according to the first characteristic value), and a grayscale for the red color in the second four color image data $\mathbf{D2}_{RGBW}$ corresponding to the grayscale for the red color of the pixel X in the four color image data $D_{RGBW}$ would be 79 (according to the second characteristic value). That is, a brightness of the grayscale for the red color in the first four color image data $\mathbf{D1}_{RGBW}$ corresponding to the grayscale for the red color of the pixel X in the four color image data $D_{RGBW}$ can be substaintially greater than or equal to a brightness of the grayscale for the red color of the pixel X in the four color image data $D_{RGBW}$, and a brightness of the grayscale for the red color in the second four color image data $\mathbf{D2}_{RGBW}$ corresponding to the grayscale for the red color of the pixel X in the four color image data $D_{RGBW}$ can be substaintially smaller than or equal to the brightness of the grayscale for the red color of the pixel X in the four color image data $D_{RGBW}$.

Since the pixels 210$_1$ and 220$_1$ in the display panel 200 include only two sub pixels respectively, the first four color image data $\mathbf{D1}_{RGBW}$ and the second four color image data $\mathbf{D2}_{RGBW}$ generated by the display data transformer 630 may still be passed through the kernel filter 620 to generate the display data needed by each of the sub pixels in the display panel 200. In some embodiments of the present invention, the kernel filter 620 may generate the display data of the sub pixels 230$A_1$, 230$B_1$, 230$C_1$ and 230$D_1$ by using the matrix K1 to calculate weighted averages on adjacent pixels in the first four color image data $D1_{RGBW}$ and the second four color image data $D2_{RGBW}$.

In some embodiments of the present invention, the display 600 may generate the first display data M230$A_1$ and M230$C_1$ of the sub pixels 230$A_1$ and 230$C_1$ by passing the first four color image data $D1_{RGBW}$ through the kernel filter 620, and generate the first display data S230$B_1$ and S230$D_1$ of the sub pixels 230$B_1$ and 230$D_1$ by passing the second four color image data $D2_{RGBW}$ through the kernel filter 620.

After the first four color image data $D1_{RGBW}$ and the second four color image data $D2_{RGBW}$ pass through the kernel filter 620, the display 600 may derive the first display data M230$A_1$, S230$B_1$, M230$C_1$ and S230$D_1$ of the sub pixels 230$A_1$, 230$B_1$, 230$C_1$ and 230$D_1$ so the display panel 200 may display the first frame of image F1 according to the first display data M230$A_1$, S230$B_1$, M230$C_1$ and S230$D_1$ of the sub pixels 230$A_1$, 230$B_1$, 230$C_1$ and 230$D_1$.

By passing the first four color image data $D1_{RGBW}$ and the second four color image data $D2_{RGBW}$ through the kernel filter 620 respectively, the first display data of M230$A_1$ and S230$B_1$ of the adjacent sub pixels 230$A_1$ and 230$B_1$ can be generated according to different types of characteristic values in the characteristic table of color shift and viewing angle, and the first display data of M230$C_1$ and S230$D_1$ of the adjacent sub pixels 230$C_1$ and 230$D_1$ can also be generated according to different types of characteristic values in the characteristic table of color shift and viewing angle. Therefore, the issue of color shift caused by different viewing angles of the users in the prior art can be solved.

Figure 9:
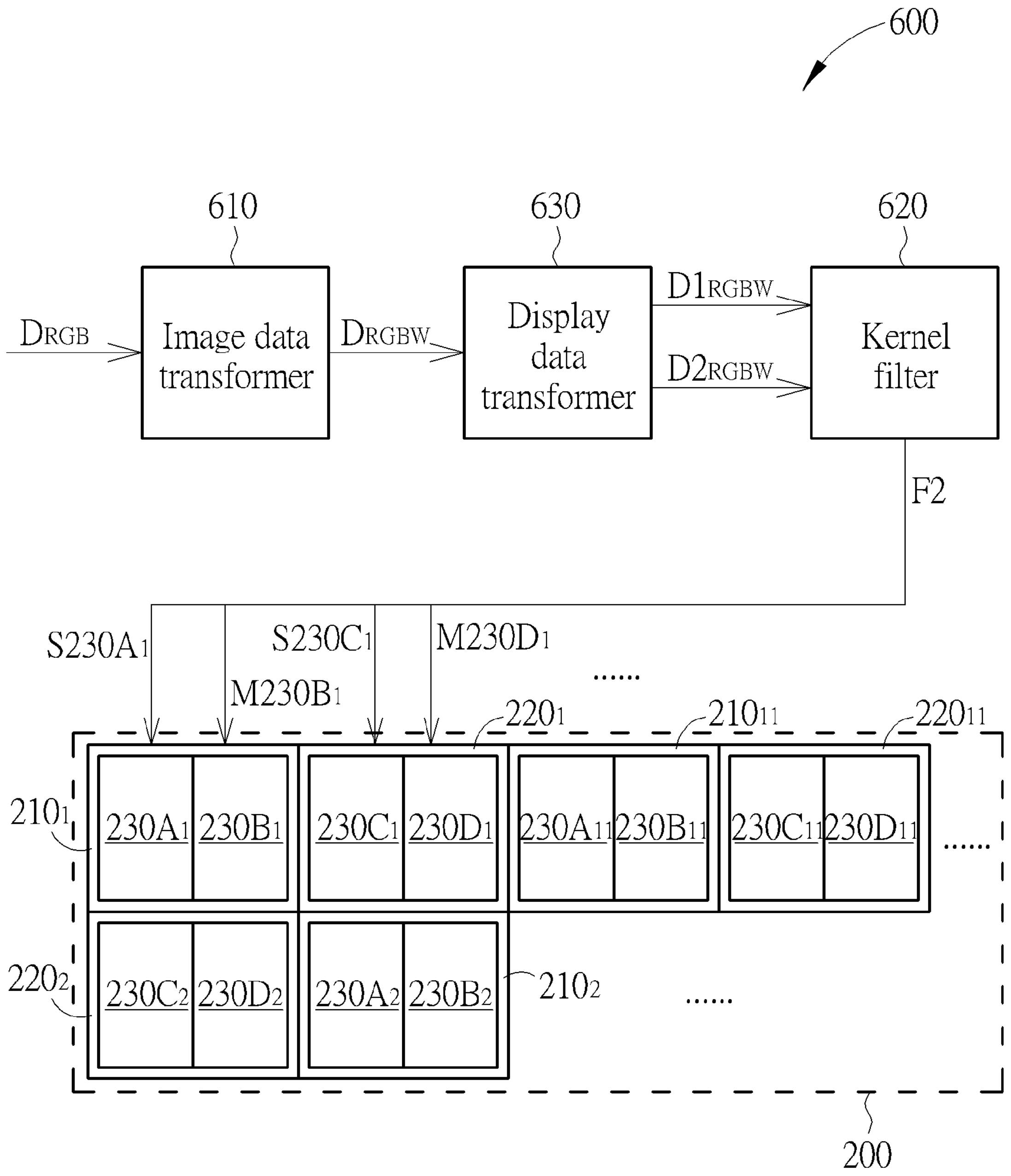
FIG. 9 shows another operation of the display in FIG. 8.

In some embodiments of the present invention, the display 600 may not only generate the first display data M230$A_1$, S230$B_1$, M230$C_1$ and S230$D_1$ of the sub pixels 230$A_1$, 230$B_1$, 230$C_1$ and 230$D_1$ according to the characteristic table of color shift and viewing angle of the display panel 200, but may also pass the first four color image data $D1_{RGBW}$ and the second four color image data $D2_{RGBW}$ through the kernel filter 620 respectively to generate the second display data of the sub pixels 230$A_1$, 230$B_1$, 230$C_1$ and 230$D_1$ according to the characteristic table of color shift and viewing angle of the display panel 200. In the embodiments in FIG. 9, the display 600 may generate the second display data M230$B_1$ and M230$D_1$ of the sub pixels 230$B_1$ and 230$D_1$ by passing the first four color image data $D1_{RGBW}$ through the kernel filter 620, and generate the second display data S230$A_1$ and S230$C_1$ of the sub pixels 230$A_1$ and 230$C_1$ by passing the second four color image data $D2_{RGBW}$ through the kernel filter 620. Consequently, after the display panel 200 displays the first frame of image F1 according to the first display data M230$A_1$, S230$B_1$, M230$C_1$ and S230$D_1$ of the sub pixels 230$A_1$, 230$B_1$, 230$C_1$ and 230$D_1$, the display panel 200 may further display the second frame of image F2 according to the second display data S230$A_1$, M230$B_1$, S230$C_1$ and M230$D_1$ of the sub pixels 230$A_1$, 230$B_1$, 230$C_1$, and 230$D_1$. In other words, in some embodiments of the present invention, the display 600 may display the first frame of image F1 and the second frame of image F2 on the display panel 200 successively during a frame period. Since the first display data M230$A_1$, S230$B_1$, M230$C_1$ and S230$D_1$ and the second display data S230$A_1$, M230$B_1$, S230$C_1$ and M230$D_1$ of the sub pixels 230$A_1$, 230$B_1$, 230$C_1$, 230$D_1$ are generated according to different types of characteristic values in the characteristic table of color shift and viewing angle, the issue of low image quality caused by a pixel for displaying with fixed brightness that is substaintially greater or substaintially smaller than the brightness than its original data for a long time can be solved.

In some embodiments of the present invention, the sub pixels 230$A_1$, 230$B_1$, 230$C_1$ and 230$D_1$ may be sub pixels disposed in a row; however, in other embodiments of the present invention, the sub pixels 230$A_1$, 230$B_1$, 230$C_1$ and 230$D_1$ may be sub pixels disposed in a column.

In some embodiments of the present invention, the display 600 may pass the first four color image data $D1_{RGBW}$ through the kernel filter 620 to generate the first display data M230$B_2$ and M230$D_2$ of the sub pixels 230$B_2$ and 230$D_2$, and may pass the second four color image data $D2_{RGBW}$ through the kernel filter 620 to generate the first display data S230$A_2$ and S230$C_2$ of the sub pixels 230$A_2$ and 230$C_2$. Consequently, the display panel 200 of the display 600 may display the first frame of image F1 according to the first display data M230$A_1$, S230$B_1$, M230$C_1$, S230$D_1$, S230$C_2$, M230$D_2$, S230$A_2$ and M230$B_2$ of the sub pixels 230$A_1$, 230$B_1$, 230$C_1$, 230$D_1$, 230$C_2$, 230$D_2$, 230$A_2$ and 230$B_2$. That is, in the display panel 200 of the display 600, the display data of each of the sub pixels may be generated according to different types of characteristic values in the characteristic table of color shift and viewing angle from the characteristic values used by its adjacent sub pixels.

In some embodiments of the present invention, the image displayed by the four color image data $D_{RGBW}$ may include edges of objects, such as the edge between an object in the foreground and an object in the background. The display 600 may pass the four color image data $D_{RGBW}$ through the kernel filter 620 to generate the display data of each of the sub pixels. If a sub pixels 230$A_3$ is generated by the kernel filter 620 from an edge of the four color image data $D_{RGBW}$, the display 600 may display the display data generated by passing the four color image data $D_{RGBW}$ through the kernel filter 620 on the display panel 200 directly without using the first four color image data $D1_{RGBW}$ and the second four color image data $D2_{RGBW}$. Consequently, the issue of edge blur caused by the sub pixels corresponding to the edges in the four color image data $D_{RGBW}$ being transformed to display different brightness can be solved. In some embodiments of the present invention, the display may pass the four color image data $D_{RGBW}$, the first four color image data $D1_{RGBW}$ and the second four color image data $D2_{RGBW}$ through the kernel filter 620 to generate three different kinds of display data of the sub pixel 230$A_3$, and then choose one kind of the display data among the three kinds display data of the sub pixel 230$A_3$ for display by using the switch.

Figure 10:
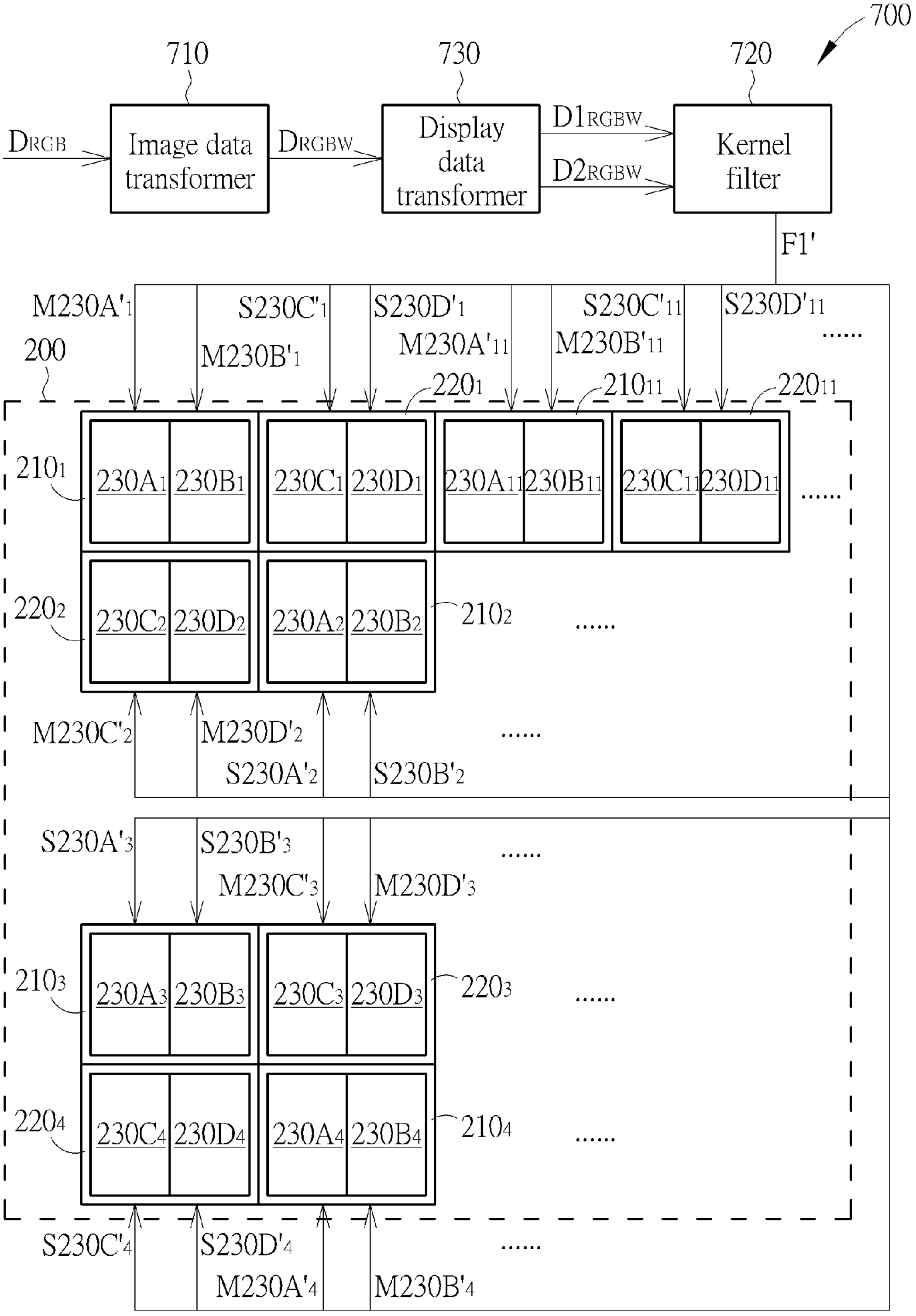
FIG. 10 shows a display according to another embodiment of the present invention.

Although in the embodiments in FIG. 8, the display data of each sub pixel may be generated according to characteristic values in the characteristic table of color shift and viewing angle that is different from the characteristic values selected by its adjacent sub pixels, the present invention is not limited to the aforesaid embodiments. FIG. 10 shows a display 700 according one embodiment of the present invention. The display 700 includes the display panel 200, an image data transformer 710, a kernel filter 720 and a display data transformer 730. The difference between the displays 700 and 600 is in that the display data transformer 730 may pass the first four color image data $D1_{RGBW}$ through the kernel filter 720 to generate the first display data M230$A'_1$, M230$B'_1$, M230$C'_2$ and M230$D'_2$ of the sub pixels 230$A_1$, 230$B_1$, 230$C_2$ and 230$D_2$ (according to the first characteristic values) and pass the pass the second four color image data $D2_{RGBW}$ through the kernel filter 720 to generate the first display data S230$C'_1$, S230$D'_1$, S230$A'_2$ and S230$B'_2$ of the sub pixels 230$C_1$, 230$D_1$, 230$A_2$ and 230$B_2$ (according to the second characteristic values). In other words, in the embodiments in FIG. 10, the display data of the two sub pixels in the same pixel can be generated according to the same column of characteristic values in the characteristic table of color shift and viewing angle of the display. For example, the display data of both of the two sub pixels in the same pixel can be generated according to the first characteristic values corresponding to the original data of the two sub pixels or the second characteristic values corresponding to the original data of the two sub pixels. Also, the display data of the sub pixels in two adjacent pixels disposed in the same row can be generated according to the different columns of characteristic values in the characteristic table of color shift and viewing angle of the display. For example, the display data of the sub pixels in two adjacent pixels can be generated according to the first characteristic value and the second characteristic value corresponding to the original data of the two sub pixels respectively, or the second characteristic value and the first characteristic value corresponding to the original data of the two sub pixels. In other words, in some embodiments of the present invention, the pixels $\mathbf{210}_1$, $\mathbf{220}_1$, $\mathbf{210}_{11}$ and $\mathbf{220}_{11}$ are disposed in the same row, the pixel $\mathbf{210}_{11}$ has sub pixels $\mathbf{230}A_{11}$ and $\mathbf{230}B_{11}$ with two different colors, the pixel $\mathbf{220}_{11}$ has sub pixels $\mathbf{230}C_{11}$ and $\mathbf{230}D_{11}$ with two different colors, and the sub pixel $\mathbf{230}A_{11}$ is right adjacent of the sub pixel $\mathbf{230}D_1$. Therefore, the display data transformer 730 may generate the first display data $M\mathbf{230}A'_{11}$ and $M\mathbf{230}B'_{11}$ of the sub pixels $\mathbf{230}A_{11}$ and $\mathbf{230}B_{11}$ according to the first characteristic values corresponding to the original data of the sub pixels $\mathbf{230}A_{11}$ and $\mathbf{230}B_{11}$ in the characteristic table of color shift and viewing angle of the display. Namely, the display data transformer 730 may pass the first four color image data $D\mathbf{1}_{RGBW}$ through the kernel filter 720 to generate the first display data $M\mathbf{230}A'_{11}$ and $M\mathbf{230}B'_{11}$ of the sub pixels $\mathbf{230}A_{11}$ and $\mathbf{230}B_{11}$. Also, the display data transformer 730 may generate the first display data $S\mathbf{230}C'_{11}$ and $S\mathbf{230}D'_{11}$ of the sub pixels $\mathbf{230}C_{11}$ and $\mathbf{230}D_{11}$ according to the second characteristic values corresponding to the original data of the sub pixels $\mathbf{230}C_{11}$ and $\mathbf{230}D_{11}$ in the characteristic table of color shift and viewing angle of the display. Namely, the display data transformer 730 may pass the second four color image data $D\mathbf{2}_{RGBW}$ through the kernel filter 720 to generate the first display data $S\mathbf{230}C'_{11}$ and $S\mathbf{230}D'_{11}$ of the sub pixels $\mathbf{230}C_{11}$ and $\mathbf{230}D_{11}$.

In the embodiments of FIG. 10, the display 700 may further pass the first four color image data $D\mathbf{1}_{RGBW}$ and the second four color image data $D\mathbf{2}_{RGBW}$ through the kernel filter 720 to generate the first display data of the sub pixels $\mathbf{230}A_3$, $\mathbf{230}B_3$, $\mathbf{230}C_3$, $\mathbf{230}D_3$, $\mathbf{230}C_4$, $\mathbf{230}D_4$, $\mathbf{230}A_4$ and $\mathbf{230}B_4$. In some embodiments of the present invention, the display data of the sub pixels $\mathbf{230}C_2$ and $\mathbf{230}D_2$, that are adjacent to the sub pixels $\mathbf{230}A_3$ and $\mathbf{230}B_3$, and the display data of the sub pixels $\mathbf{230}C_4$ and $\mathbf{230}D_4$, that are adjacent to the sub pixels $\mathbf{230}A_3$, $\mathbf{230}B_3$, may be generated according to different types of characteristic values in the characteristic table of color shift and viewing angle. Also, the display data of the sub pixels $\mathbf{230}A_1$ and $\mathbf{230}B_1$, that are adjacent to the sub pixels $\mathbf{230}C_2$ and $\mathbf{230}D_2$, and the display data of the sub pixels $\mathbf{230}A_3$ and $\mathbf{230}B_3$, that are adjacent to the sub pixels $\mathbf{230}C_2$ and $\mathbf{230}D_2$, may be generated according to different types of characteristic values in the characteristic table of color shift and viewing angle. In other words, the display may pass the first four color image data $D\mathbf{1}_{RGBW}$ through the kernel filter 720 to generate the first display data $M\mathbf{230}C'_3$, $M\mathbf{230}D'_3$, $M\mathbf{230}A'_4$ and $M\mathbf{230}B'_4$ of the sub pixels $\mathbf{230}C_3$, $\mathbf{230}D_3$, $\mathbf{230}A_4$ and $\mathbf{230}B_4$ (according to the first characteristic value), and may pass the second four color image data $D\mathbf{2}_{RGBW}$ through the kernel filter 720 to generate the first display data $S\mathbf{230}A'_3$, $S\mathbf{230}B'_3$, $S\mathbf{230}C'_4$ and $S\mathbf{230}D'_4$ of the sub pixels $\mathbf{230}A_3$, $\mathbf{230}B_3$, $\mathbf{230}C_4$ and $\mathbf{230}D_4$ (according to the second characteristic value).

Figure 11:
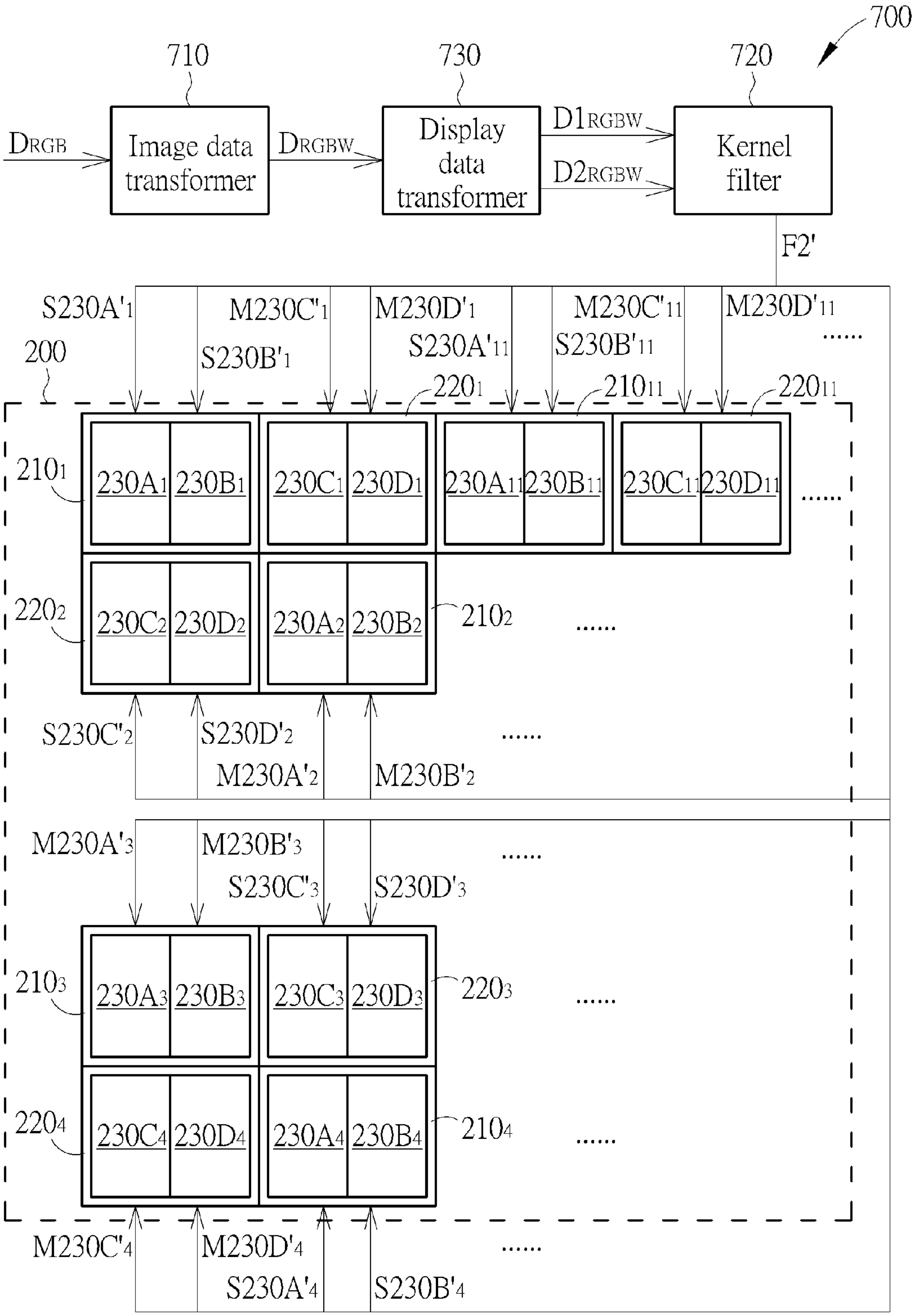
FIG. 11 shows another operation of the display in FIG. 10.

In some embodiments of the present invention, the display 700 may not only generate the first display data $M\mathbf{230}A'_1$, $M\mathbf{230}B'_1$, $S\mathbf{230}C'_1$, $S\mathbf{230}D'_1$, $M\mathbf{230}C'_2$, $M\mathbf{230}D'_2$, $S\mathbf{230}A'_2$, $S\mathbf{230}B'_2$, $S\mathbf{230}A'_3$, $S\mathbf{230}B'_3$, $M\mathbf{230}C'_3$, $M\mathbf{230}D'_3$, $S\mathbf{230}C'_4$, $S\mathbf{230}D'_4$, $M\mathbf{230}A'_4$ and $M\mathbf{230}B'_4$ of the sub pixels $\mathbf{230}A_1$, $\mathbf{230}B_1$, $\mathbf{230}C_1$, $\mathbf{230}D_1$, $\mathbf{230}C_2$, $\mathbf{230}D_2$, $\mathbf{230}A_2$, $\mathbf{230}B_2$, $\mathbf{230}A_3$, $\mathbf{230}B_3$, $\mathbf{230}C_3$, $\mathbf{230}D_3$, $\mathbf{230}C_4$, $\mathbf{230}D_4$, $\mathbf{230}A_4$ and $\mathbf{230}B_4$ according to the characteristic table of color shift and viewing angle of the display panel 200, but may also generate the second display data of the sub pixels $\mathbf{230}A_1$, $\mathbf{230}B_1$, $\mathbf{230}C_1$, $\mathbf{230}D_1$, $\mathbf{230}C_2$, $\mathbf{230}D_2$, $\mathbf{230}A_2$, $\mathbf{230}B_2$, $\mathbf{230}A_3$, $\mathbf{230}B_3$, $\mathbf{230}C_3$, $\mathbf{230}D_3$, $\mathbf{230}C_4$, $\mathbf{230}D_4$, $\mathbf{230}A_4$ and $\mathbf{230}B_4$ according to the characteristic table of color shift and viewing angle of the display panel 200. In the embodiment in FIG. 11, the display 700 may pass the second four color image data $D\mathbf{2}_{RGBW}$ through the kernel filter 720 to generate the second display data $S\mathbf{230}A'_1$, $S\mathbf{230}B'_1$, $S\mathbf{230}C'_2$, $S\mathbf{230}D'_2$, $S\mathbf{230}C'_3$, $S\mathbf{230}D'_3$, $S\mathbf{230}A'_4$ and $S\mathbf{230}B'_4$ of the sub pixels $\mathbf{230}A_1$, $\mathbf{230}B_1$, $\mathbf{230}C_2$, $\mathbf{230}D_2$, $\mathbf{230}C_3$, $\mathbf{230}D_3$, $\mathbf{230}A_4$ and $\mathbf{230}B_4$ (according to the second characteristic values), and may pass the first four color image data $D\mathbf{1}_{RGBW}$ through the kernel filter 720 to generate the second display data $M\mathbf{230}C'_1$, $M\mathbf{230}D'_1$, $M\mathbf{230}A'_2$, $M\ \mathbf{230}B'_2$, $M\ \mathbf{230}A'_3$, $M\ \mathbf{230}B'_3$, $M\ \mathbf{230}C'_4$ and $M\ \mathbf{230}D'_4$ of the sub pixels $\mathbf{230}C_1$, $\mathbf{230}D_1$, $\mathbf{230}A_2$, $\mathbf{230}B_2$, $\mathbf{230}A_3$, $\mathbf{230}B_3$, $\mathbf{230}C_4$ and $\mathbf{230}D_4$ (according to the first characteristic values).

Consequently, after the display 700 displays the first frame of image F1' on the display panel 200 according to the first display data $M\mathbf{230}A'_1$, $M\mathbf{230}B'_1$, $S\mathbf{230}C'_1$, $S\mathbf{230}D'_1$, $M\mathbf{230}C'_2$, $M\mathbf{230}D'_2$, $S\mathbf{230}A'_2$, $S\mathbf{230}B'_2$, $S\mathbf{230}A'_3$, $S\mathbf{230}B'_3$, $M\mathbf{230}C'_3$, $M\mathbf{230}D'_3$, $S\mathbf{230}C'_4$, $S\mathbf{230}D'_4$, $M\mathbf{230}A'_4$ and $M\mathbf{230}B'_4$ of the sub pixels $\mathbf{230}A_1$, $\mathbf{230}B_1$, $\mathbf{230}C_1$, $\mathbf{230}D_1$, $\mathbf{230}C_2$, $\mathbf{230}D_2$, $\mathbf{230}A_2$, $\mathbf{230}B_2$, $\mathbf{230}A_3$, $\mathbf{230}B_3$, $\mathbf{230}C_3$, $\mathbf{230}D_3$, $\mathbf{230}C_4$, $\mathbf{230}D_4$, $\mathbf{230}A_4$ and $\mathbf{230}B_4$, the display 700 may further display a second frame of image F2' on the display panel 200 according to the second display data $S\mathbf{230}A'_1$, $S\mathbf{230}B'_1$, $M\mathbf{230}C'_1$, $M\mathbf{230}D'_1$, $S\mathbf{230}C'_2$, $S\mathbf{230}D'_2$, $M\mathbf{230}A'_2$, $M\mathbf{230}B'_2$, $M\mathbf{230}A'_3$, $M\mathbf{230}B'_3$, $S\mathbf{230}C'_3$, $S\mathbf{230}D'_3$, $M\mathbf{230}C'_4$, $M\mathbf{230}D'_4$, $S\mathbf{230}A'_4$ and $S\mathbf{230}B'_4$ of the sub pixels $\mathbf{230}A_1$, $\mathbf{230}B_1$, $\mathbf{230}C_1$, $\mathbf{230}D_1$, $\mathbf{230}C_2$, $\mathbf{230}D_2$, $\mathbf{230}A_2$, $\mathbf{230}B_2$, $\mathbf{230}A_3$, $\mathbf{230}B_3$, $\mathbf{230}C_3$, $\mathbf{230}D_3$, $\mathbf{230}C_4$, $\mathbf{230}D_4$, $\mathbf{230}A_4$ and $\mathbf{230}B_4$. That is, in some embodiments of the present invention, the display 700 may display the first frame of image F1' and the second frame of image F2' on the display panel 200 successively during a frame period. Since the first display data and the second display data of the sub pixels $\mathbf{230}A_1$, $\mathbf{230}B_1$, $\mathbf{230}C_1$, $\mathbf{230}D_1$, $\mathbf{230}C_2$, $\mathbf{230}D_2$, $\mathbf{230}A_2$, $\mathbf{230}B_2$, $\mathbf{230}A_3$, $\mathbf{230}B_3$, $\mathbf{230}C_3$, $\mathbf{230}D_3$, $\mathbf{230}C_4$, $\mathbf{230}D_4$, $\mathbf{230}A_4$ and $\mathbf{230}B_4$ are generated according to different types of characteristic values in the characteristic table of color shift and viewing angle, the issue of low image quality caused by a pixel for displaying with fixed brightness that is substaintially greater or substaintially smaller than the brightness than its original data for a long time can be solved.

According to displays 300, 500, 600 and 700, the brightness of each of the pixels can be adjusted according to the characteristic table of color shift and viewing angle so that the issue of color shift caused by different viewing angles of the users in the prior art can be solved.

Figure 12:
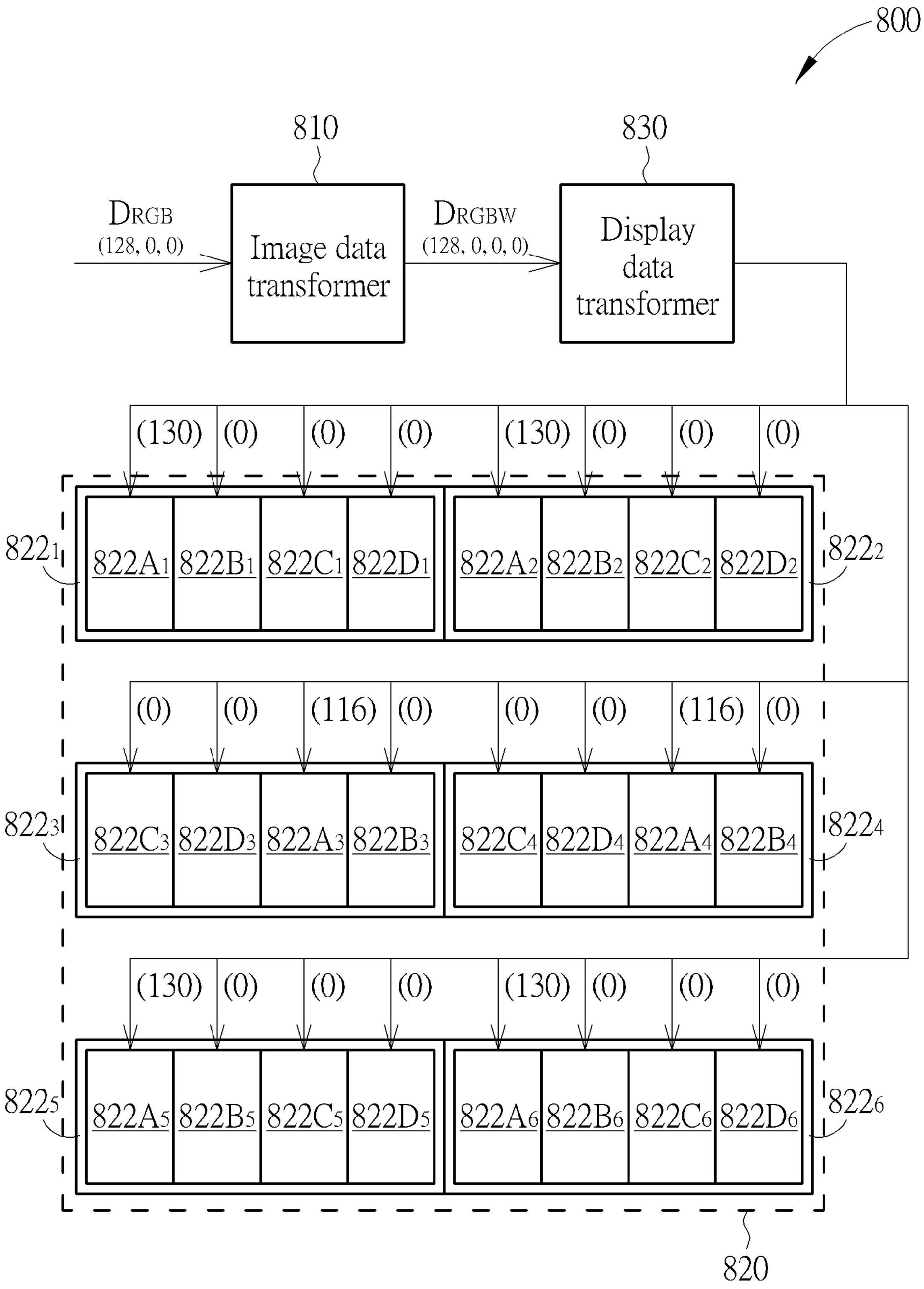
FIG. 12 shows a display according to another embodiment of the present invention.

FIG. 12 shows a display 800 according to one embodiment of the present invention. The display 800 includes an image data transformer 810, a display panel 820, and a display data transformer 830. The display panel 820 includes six pixels $822_1$-$822_6$. The pixel $822_1$ includes a first color sub pixel 822$A_1$, a second color sub pixel 822$B_1$, a third color sub pixel 822$C_1$ and a fourth color sub pixel 822$D_1$. The pixel $822_2$ includes a first color sub pixel 822$A_2$, a second color sub pixel 822$B_2$, a third color sub pixel 822$C_2$ and a fourth color sub pixel 822$D_2$. The pixel $822_3$ includes a first color sub pixel 822$A_3$, a second color sub pixel 822$B_3$, a third color sub pixel 822$C_3$ and a fourth color sub pixel 822$D_3$. The pixel $822_4$ includes a first color sub pixel 822$A_4$, a second color sub pixel 822$B_4$, a third color sub pixel 822$C_4$ and a fourth color sub pixel 822$D_4$. The pixel $822_5$ includes a first color sub pixel 822$A_5$, a second color sub pixel 822$B_5$, a third color sub pixel 822$C_5$ and a fourth color sub pixel 822$D_5$. The pixel $822_6$ includes a first color sub pixel 822$A_6$, a second color sub pixel 822$B_6$, a third color sub pixel 822$C_6$ and a fourth color sub pixel 822$D_6$. In the display panel 820, four sub pixels in a same pixel are all disposed in a same row of the display panel 820. In some embodiments of the present invention, the first color sub pixel of each of the pixels in the display panel 820 is red sub pixel, the second color sub pixel of each of the pixels is green sub pixel, the third color sub pixel of each of the pixels is blue sub pixel, and the fourth color sub pixel of each of the pixels is white sub pixel. However, the colors of the sub pixels in the present invention are not limited to the aforesaid embodiment.

The image data transformer 810 may transform the three color image data $D_{RGB}$ required by the traditional display to the four color image data $D_{RGBW}$ by color mapping. In some embodiments of the present invention, the image data transformer 810 may have same operational principles as the image data transformer 310 has for generating the four color image data $D_{RGBW}$. The three color image data $D_{RGB}$ include grayscales for the sub pixels of three colors in the traditional display, and the four color image data $D_{RGBW}$ include the grayscales corresponding to the sub pixels in each of the pixels $822_1$ to $822_6$.

To solve the issue of color shift caused by different viewing angles of the users for the display 800, the display data transformer 830 may generate the grayscales that will be displayed practically by the sub pixels of each of the pixels $822_1$ to $822_6$ by transforming the four color image data $D_{RGBW}$ according to the characteristic table of color shift and viewing angle of the display panel 820 so that the display panel 820 will display images according to the grayscales displayed by the sub pixels of each of the pixels $822_1$ to $822_6$.

Although Table 1 does not provide first characteristic values and second characteristic values according the colors of the original data and assumes the maximum grayscale to be 128, the present invention is not limited to apply Table 1. Tables 2-4 show parts of the characteristic table of color shift and viewing angle of the display panel 820 according to one embodiment of the present invention. In Tables 2-4, the same grayscales of different colors may correspond to different first characteristic values and different second characteristic values. Also, the maximum grayscale in Tables 2-4 is 256.

TABLE 2

| Original data for red color | First characteristic value for red color | Second characteristic value for red color |
|---|---|---|
| 128 | 130 | 116 |
| 192 | 200 | 190 |

TABLE 3

| Original data for green color | First characteristic value for green color | Second characteristic value for green color |
|---|---|---|
| 128 | 135 | 110 |
| 192 | 199 | 188 |

TABLE 4

| Original data for blue color | First characteristic value for blue color | Second characteristic value for blue color |
|---|---|---|
| 128 | 133 | 100 |
| 192 | 197 | 189 |

The first column in Table 2 is the original data for red color. The second and third columns in Table 2 are the first characteristic values and the second characteristic values corresponding to the original data for red color in the first column. The first column in Table 3 is the original data for green color. The second and third columns in Table 3 are the first characteristic values and the second characteristic values corresponding to the original data for green color in the first column. The first column in Table 4 is the original data for blue color. The second and third columns in Table 2 are the first characteristic values and the second characteristic values corresponding to the original data for blue color in the first column.

In some embodiments of the present invention, if the original grayscale of the first color sub pixel 822$A_1$ of the pixel $822_1$ in the four color image data $D_{RGBW}$ is 128, then the display data transformer 830 may generate the grayscale displayed by the first color sub pixel 822$A_1$ according to the first characteristic value, 130, or the second characteristic value, 116, in Table 2. If the original grayscale of the second color sub pixel 822$B_1$ of the pixel $822_1$ in the four color image data $D_{RGBW}$ is 128, then the display data transformer 830 may generate the grayscale displayed by the second color sub pixel 822$B_1$ according to the first characteristic value, 135, or the second characteristic value, 110, in Table 3. If the original grayscale of the third color sub pixel 822$C_1$ of the pixel $822_1$ in the four color image data $D_{RGBW}$ is 128, then the display data transformer 830 may generate the grayscale displayed by the third color sub pixel 822$C_1$ according to the first characteristic value, 133, or the second characteristic value, 100, in Table 4. Therefore, even the original grayscales for the sub pixels of different colors are the same, the grayscales displayed by the sub pixels of different colors that are generated by the display data transformer 830 may still be different from each other.

In some embodiments of the present invention, the three color image data $D_{RGB}$ may be used to display image of single color, that is, all pixels present the same color with same brightness. When the three color image data $D_{RGB}$ is used to display image of single color, the four color image data $D_{RGBW}$ generated by the image data transformer 810 by transforming the three color image data $D_{RGB}$ will also be used to display the image of single color. For example, the three color image data $D_{RGB}$ may include the red data, the green data and the blue data for displaying the image of single color. If the grayscales of the red data, the green data and the blue data are represented as (128, 0, 0), then, when the image data transformer 810 generates the four color image data $D_{RGBW}$ with the same operation principle of the image data transformer 310, the grayscales of the red data, the green data, the blue data, and the white color may be represented as (128, 0, 0, 0) in the four color image data $D_{RGBW}$.

In some embodiments of the present invention, the display data transformer 830 may generate the grayscale displayed by the first color sub pixel 822$A_1$ of the pixel 822$_1$ according to the first characteristic values corresponding to each of the grayscales in the characteristic table of color shift and viewing angle of the display panel 820. For example, according to Table 2, the grayscale displayed by the first sub pixel 822$A_1$ of the pixel 822$_1$ can be set as 130, which is different from the original grayscale of 128. Also, the grayscales displayed by the second color sub pixel 822$B_1$, the third color sub pixel 822$C_1$, and the fourth color sub pixel 822$D_1$ may still be 0.

In some embodiments of the present invention, the grayscale displayed by the first color sub pixel 822$A_2$ of the pixel 822$_2$, which is disposed in a same row as the pixel 822$_1$, may be same as the grayscale displayed by the first color sub pixel 822$A_1$ of the pixel 822$_1$, namely, 130. Also, the display data transformer 830 may generate the grayscales displayed by the first color sub pixels disposed in two adjacent rows according to the first characteristic values and the second characteristic values corresponding to each of the grayscale respectively in the characteristic table of color shift and viewing angle of the display panel 820. In other words, the grayscales displayed by the first color sub pixels disposed in two adjacent rows may be different. For example, the pixels 822$_1$ and 822$_3$ are disposed in two adjacent rows so that the display data transformer 830 may generate the grayscale, 130, displayed by the first color sub pixel 822$A_1$ of the pixel 822$_1$ according to the first characteristic values corresponding to each of the grayscales in the characteristic table of color shift and viewing angle of the display panel 820, and may generate the grayscale, 116, displayed by the first color sub pixel 822$A_3$ of the pixel 822$_3$ according to the second characteristic values corresponding to each of the grayscales in the characteristic table of color shift and viewing angle of the display panel 820. Also, since the pixels 822$_5$ and 822$_3$ are also disposed in two adjacent rows, the display data transformer 830 may generate the grayscale, 130, displayed by the first color sub pixel 822$A_5$ of the pixel 822$_5$ according to the first characteristic values corresponding to each of the grayscales in the characteristic table of color shift and viewing angle of the display panel 820.

Although in the aforesaid embodiments, the pixels 822$_1$ and 822$_2$ in the display panel 820 are pixels in the same row and the four sub pixels of the same pixel are disposed in the same row in the display panel 820, in other embodiments of the present invention, the pixels 822$_1$ and 822$_2$ can also be adjacent pixels in the same column and the four sub pixels of the same pixel can be disposed in the same column in the display panel 820. In this case, if the four color image data is still for image of a single color and the grayscales corresponding to the red, green, blue, and white color sub pixels are still represented as (128, 0, 0, 0), then the grayscales displayed by the first color sub pixels of the pixels in the same column will be the same, and the grayscales displayed by the first color sub pixels of the pixels in two adjacent columns will be different.

Furthermore, in FIG. 12, the sub pixels of different colors of the pixels in the same row are disposed in a same order, and the sub pixels of different colors of the pixels in two adjacent rows are disposed in different orders. For example, the first color sub pixel 822$A_1$, the second color sub pixel 822$B_1$, the third color sub pixel 822$C_1$, and the fourth color sub pixel 822$D_1$ of the pixel 822$_1$ are disposed in a different order from the first color sub pixel 822$A_3$, the second color sub pixel 822$B_3$, the third color sub pixel 822$C_3$, and the fourth color sub pixel 822$D_3$ of the pixel 822$_3$ are disposed. However, the present invention is not limited by the aforesaid embodiments. In other embodiments of the present invention, the sub pixels of all the pixels can be disposed in a same order.

Figure 13:
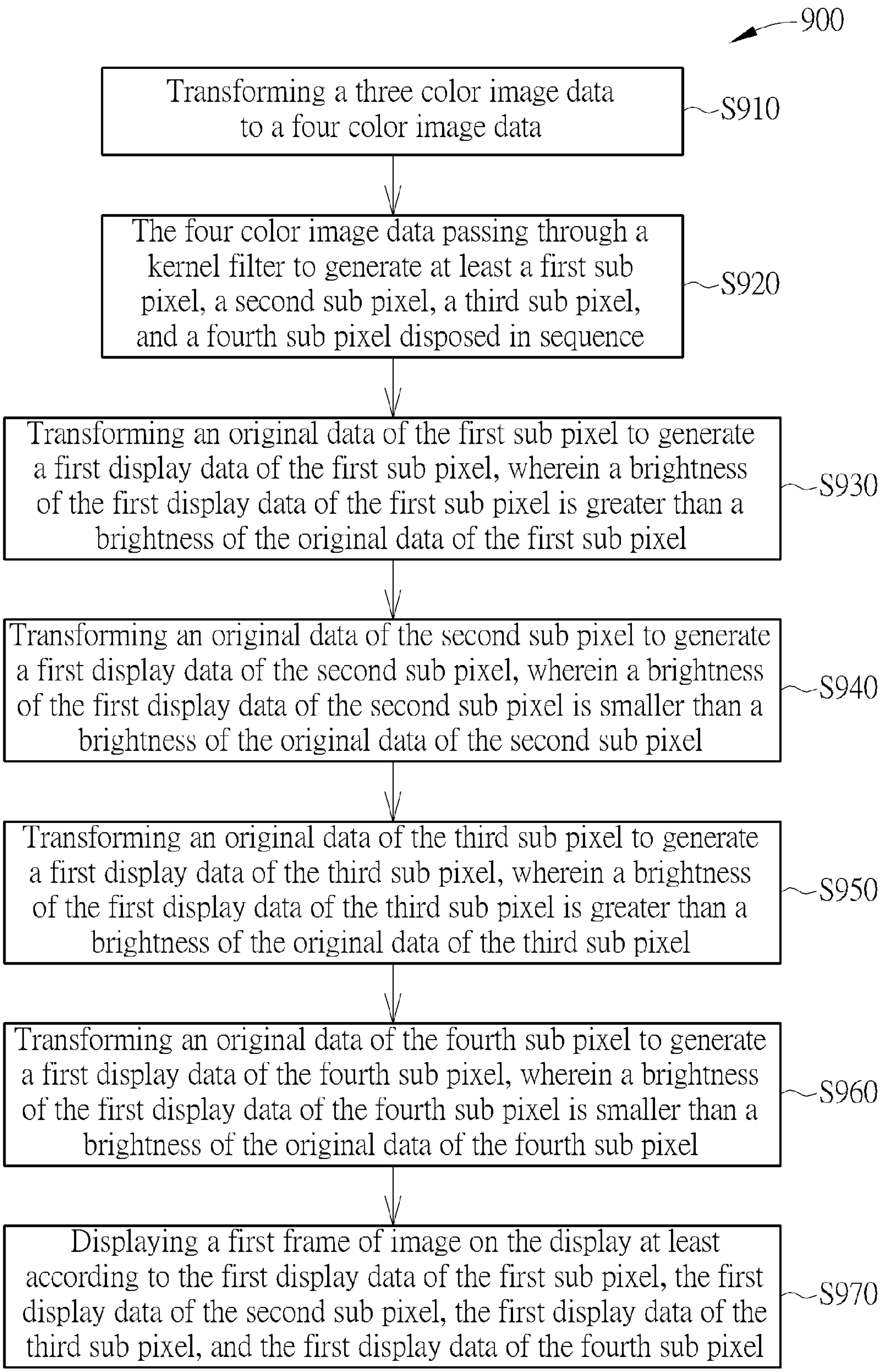
FIG. 13 shows an image processing method of a display according to one embodiment of the present invention.

FIG. 13 shows an image processing method 900 according to one embodiment of the present invention. The image processing method 900 includes steps S910 to S970 but not limited to the order from steps S910 to S970:

S910: transforming a three color image data to a four color image data;

S920: the four color image data passing through a kernel filter to generate original data corresponding to a first sub pixel, a second sub pixel, a third sub pixel, and a fourth sub pixel disposed in sequence;

S930: transforming an original data of the first sub pixel to generate a first display data of the first sub pixel, wherein a brightness of the first display data of the first sub pixel is substaintially greater than a brightness of the original data of the first sub pixel;

S940: transforming an original data of the second sub pixel to generate a first display data of the second sub pixel, wherein a brightness of the first display data of the second sub pixel is substaintially smaller than a brightness of the original data of the second sub pixel;

S950: transforming an original data of the third sub pixel to generate a first display data of the third sub pixel, wherein a brightness of the first display data of the third sub pixel is substaintially greater than a brightness of the original data of the third sub pixel;

S960: transforming an original data of the fourth sub pixel to generate a first display data of the fourth sub pixel, wherein a brightness of the first display data of the fourth sub pixel is substaintially smaller than a brightness of the original data of the fourth sub pixel; and

S970: displaying a first frame of image on the display at least according to the first display data of the first sub pixel, the first display data of the second sub pixel, the first display data of the third sub pixel, and the first display data of the fourth sub pixel.

In some embodiments of the present invention, the image processing method 900 may apply to the display 300, and the first sub pixel can be the sub pixel 230$A_1$ in the display panel 200 of the display 300, the second sub pixel can be the sub pixel 230$B_1$ in the display panel 200 of the display 300, the third sub pixel can be the sub pixel 230$C_1$ in the display panel 200 of the display 300, and the fourth sub pixel can be the sub pixel 230$D_1$ in the display panel 200 of the display 300. In addition, the steps S930 to S960 can be operated in an arbitrary manner or even be operated in the same time as the system need.

Figure 14:
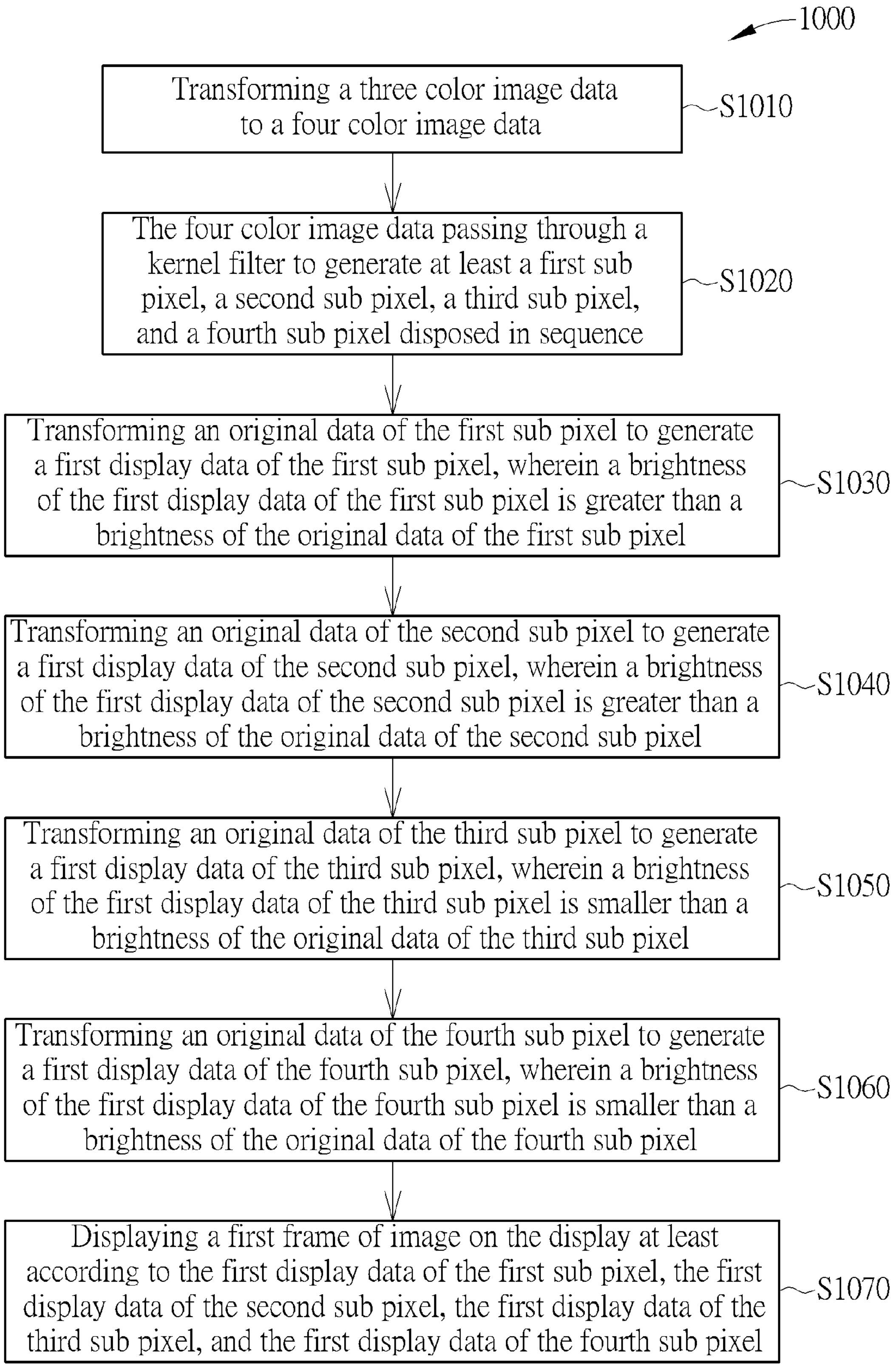
FIG. 14 shows an image processing method of a display according to another embodiment of the present invention.

FIG. 14 shows an image processing method 1000 according to one embodiment of the present invention. The image processing method 1000 includes steps S1010 to S1070 but not limited to the order from steps S1010 to S1070:

S1010: transforming a three color image data to a four color image data;

S1020: the four color image data passing through a kernel filter to generate original data corresponding to a first sub pixel, a second sub pixel, a third sub pixel, and a fourth sub pixel disposed in sequence;

S1030: transforming an original data of the first sub pixel to generate a first display data of the first sub pixel, wherein a brightness of the first display data of the first sub pixel is substaintially greater than a brightness of the original data of the first sub pixel;

S1040: transforming an original data of the second sub pixel to generate a first display data of the second sub pixel, wherein a brightness of the first display data of the second sub pixel is substaintially greater than a brightness of the original data of the second sub pixel;

S1050: transforming an original data of the third sub pixel to generate a first display data of the third sub pixel, wherein a brightness of the first display data of the third sub pixel is substaintially smaller than a brightness of the original data of the third sub pixel;

S1060: transforming an original data of the fourth sub pixel to generate a first display data of the fourth sub pixel, wherein a brightness of the first display data of the fourth sub pixel is substaintially smaller than a brightness of the original data of the fourth sub pixel; and

S1070: displaying a first frame of image on the display at least according to the first display data of the first sub pixel, the first display data of the second sub pixel, the first display data of the third sub pixel, and the first display data of the fourth sub pixel.

In some embodiments of the present invention, the image processing method 1000 may apply to the display 500, and the first sub pixel can be the sub pixel 230$A_1$ in the display panel 200 of the display 500, the second sub pixel can be the sub pixel 230$B_1$ in the display panel 200 of the display 500, the third sub pixel can be the sub pixel 230$C_1$ in the display panel 200 of the display 500, and the fourth sub pixel can be the sub pixel 230$D_1$ in the display panel 200 of the display 500. In addition, the steps S1030 to S1060 can be operated in an arbitrary manner or even be operated in the same time as the system requires.

Figure 15:
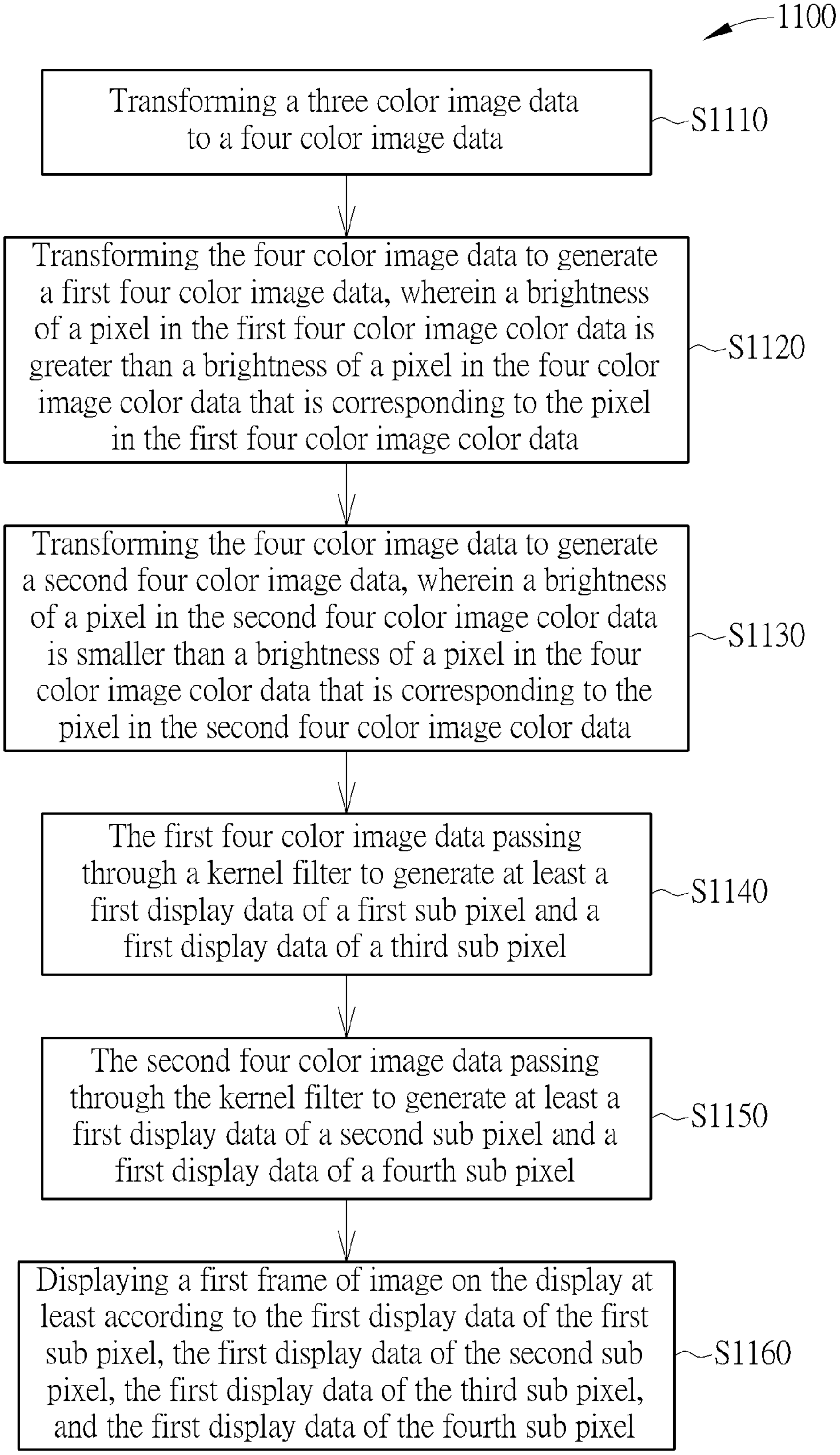
FIG. 15 shows an image processing method of a display according to another embodiment of the present invention.

FIG. 15 shows an image processing method 1100 according to one embodiment of the present invention. The image processing method 1100 includes steps S1110 to S1160 but not limited to the order from steps S1110 to S1160:

S1110: transforming a three color image data to a four color image data;

S1120: transforming the four color image data to generate a first four color image data, wherein a brightness of a pixel in the first four color image color data is substaintially greater than a brightness of a pixel in the four color image color data that is corresponding to the pixel in the first four color image color data;

S1130: transforming the four color image data to generate a second four color image data, wherein a brightness of a pixel in the second four color image color data is substaintially smaller than a brightness of a pixel in the four color image color data that is corresponding to the pixel in the second four color image color data;

S1140: the first four color image data passing through a kernel filter to generate at least a first display data of a first sub pixel and a first display data of a third sub pixel;

S1150: the second four color image data passing through the kernel filter to generate at least a first display data of a second sub pixel and a first display data of a fourth sub pixel; and

S1160: displaying a first frame of image on the display at least according to the first display data of the first sub pixel, the first display data of the second sub pixel, the first display data of the third sub pixel, and the first display data of the fourth sub pixel.

In some embodiments of the present invention, the image processing method 1100 may apply to the display 600, and the first sub pixel can be the sub pixel 230$A_1$ in the display panel 200 of the display 600, the second sub pixel can be the sub pixel 230$B_1$ in the display panel 200 of the display 600, the third sub pixel can be the sub pixel 230$C_1$ in the display panel 200 of the display 600, and the fourth sub pixel can be the sub pixel 230$D_1$ in the display panel 200 of the display 600. In addition, the steps S1120 to S1130 can be operated in an arbitrary manner or even be operated in the same time as the system need, and the steps S1140 to S1150 can be operated in an arbitrary manner or even be operated in the same time as the system requires.

Figure 16:
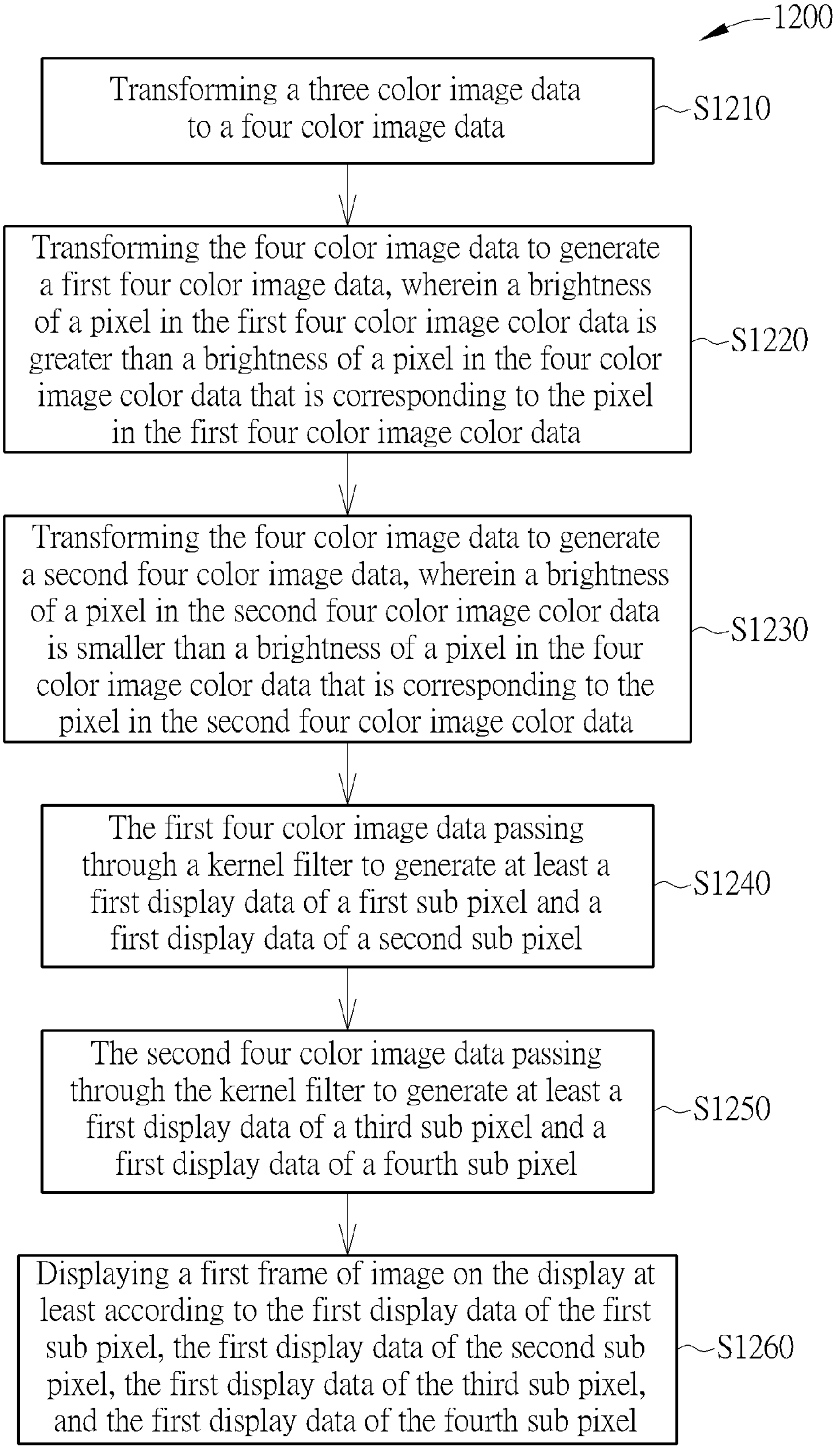
FIG. 16 shows an image processing method of a display according to another embodiment of the present invention.

FIG. 16 shows an image processing method 1200 according to one embodiment of the present invention. The image processing method 1200 includes steps S1210 to S1260 but not limited to the order from steps S1110 to S1160:

S1210: transforming a three color image data to a four color image data;

S1220: transforming the four color image data to generate a first four color image data, wherein a brightness of a pixel in the first four color image color data is substaintially greater than a brightness of a pixel in the four color image color data that is corresponding to the pixel in the first four color image color data;

S1230: transforming the four color image data to generate a second four color image data, wherein a brightness of a pixel in the second four color image color data is substaintially smaller than a brightness of a pixel in the four color image color data that is corresponding to the pixel in the second four color image color data;

S1240: the first four color image data passing through a kernel filter to generate at least a first display data of a first sub pixel and a first display data of a second sub pixel;

S1250: the second four color image data passing through the kernel filter to generate at least a first display data of a third sub pixel and a first display data of a fourth sub pixel; and

S1260: displaying a first frame of image on the display at least according to the first display data of the first sub pixel, the first display data of the second sub pixel, the first display data of the third sub pixel, and the first display data of the fourth sub pixel.

In some embodiments of the present invention, the image processing method 1200 may apply to the display 700, and the first sub pixel can be the sub pixel 230$A_1$ in the display panel 200 of the display 700, the second sub pixel can be the sub pixel 230$B_1$ in the display panel 200 of the display 700, the third sub pixel can be the sub pixel 230$C_1$ in the display panel 200 of the display 700, and the fourth sub pixel can be the sub pixel 230$D_1$ in the display panel 200 of the display 700. In addition, the steps S1220 to S1230 can be operated in an arbitrary manner or even be operated in the same time as the system need, and the steps S1240 to S1250 can be operated in an arbitrary manner or even be operated in the same time as the system need.

Figure 17:
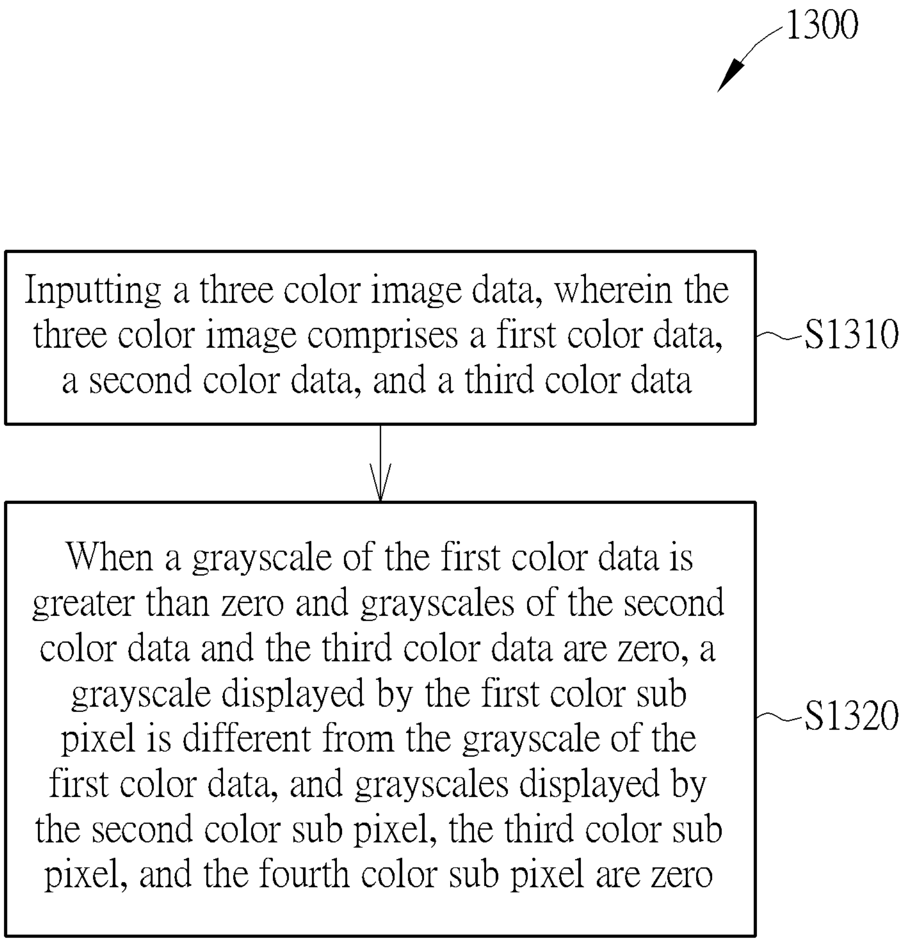
FIG. 17 shows an image processing method of a display according to another embodiment of the present invention.

FIG. 17 shows an image processing method 1300 according to one embodiment of the present invention. The image processing method 1300 includes steps S1310 to S1320 but not limited to the order from steps S1310 to S1320:

S1310: inputting a three color image data, wherein the three color image comprises a first color data, a second color data, and a third color data; and S1320: when a grayscale of the first color data is substaintially greater than zero and grayscales of the second color data and the third color data are zero, a grayscale displayed by the first color sub pixel is different from the grayscale of the first color data, and grayscales displayed by the second color sub pixel, the third color sub pixel, and the fourth color sub pixel are zero.

In some embodiments of the present invention, the image processing method 1300 may apply to the display 800. The first color sub pixel can be the first color sub pixel 822$A_1$ in the display panel 820, the second color sub pixel can be the second color sub pixel 822$B_1$ in the display panel 820, the third color sub pixel can be the third color sub pixel 822$C_1$ in the display panel 820, and the fourth color sub pixel can be the fourth color sub pixel 822$D_1$ in the display panel 820.

In summary, according to the displays and the image processing methods of the embodiments of the present invention, the brightness of each of the pixels can be adjusted according to the characteristic table of color shift and viewing angle of the display panel so that the issue of color shift caused by different viewing angles of the users in the prior art can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method of a display, comprising:

transforming, by an image data transformer of the display, a three color image data to a four color image data;

generating, by a kernel filter of the display, original data corresponding to a first sub pixel, a second sub pixel, a third sub pixel and a fourth sub pixel disposed in sequence by passing the four color image data through the kernel filter, wherein the second sub pixel is adjacent to the first sub pixel and the third sub pixel, the third sub pixel is adjacent to the fourth sub pixel, and the first sub pixel, the second sub pixel, the third sub pixel and the fourth sub pixel are sub pixels with different colors;

transforming, by a display data transformer of the display, an original data of the first sub pixel to generate a first display data of the first sub pixel, wherein a brightness of the first display data of the first sub pixel is substantially greater than a brightness of the original data of the first sub pixel;

transforming, by the display data transformer, an original data of the second sub pixel to generate a first display data of the second sub pixel, wherein a brightness of the first display data of the second sub pixel is substantially smaller than a brightness of the original data of the second sub pixel;

transforming, by the display data transformer, an original data of the third sub pixel to generate a first display data of the third sub pixel, wherein a brightness of the first display data of the third sub pixel is substantially greater than a brightness of the original data of the third sub pixel;

transforming, by the display data transformer, an original data of the fourth sub pixel to generate a first display data of the fourth sub pixel, wherein a brightness of the first display data of the fourth sub pixel is substantially smaller than a brightness of the original data of the fourth sub pixel; and displaying, by a display panel of the display, a first frame of image on the display according to the first display data of the first sub pixel, the first display data of the second sub pixel, the first display data of the third sub pixel, and the first display data of the fourth sub pixel.

2. The method of claim 1, further comprising:

transforming, by the display data transformer, the original data of the first sub pixel to generate a second display data of the first sub pixel, wherein a brightness of the second display data of the first sub pixel is substantially smaller than the brightness of the original data of the first sub pixel;

transforming, by the display data transformer, the original data of the second sub pixel to generate a second display data of the second sub pixel, wherein a brightness of the second display data of the second sub pixel is substantially greater than the brightness of the original data of the second sub pixel;

transforming, by the display data transformer, the original data of the third sub pixel to generate a second display data of the third sub pixel, wherein a brightness of the second display data of the third sub pixel is substantially smaller than the brightness of the original data of the third sub pixel;

transforming, by the display data transformer, the original data of the fourth sub pixel to generate a second display data of the fourth sub pixel, wherein a brightness of the second display data of the fourth sub pixel is substantially greater than the brightness of the original data of the fourth sub pixel; and displaying, by the display panel, a second frame of image on the display at least according to the second display data of the first sub pixel, the second display data of the second sub pixel, the second display data of the third sub pixel, and the second display data of the fourth sub pixel.

3. The method of claim 1, wherein the first sub pixel, the second sub pixel, the third sub pixel and the fourth sub pixel are sub pixels disposed in a same column or in a same row.

4. The method of claim 1, wherein the four color image data passes through the kernel filter to further generate original data corresponding to a fifth sub pixel, a sixth sub pixel, a seventh sub pixel and an eighth sub pixel disposed in sequence, wherein the fifth sub pixel is adjacent to the first sub pixel, the sixth sub pixel is adjacent to the second sub pixel, the fifth sub pixel and the seventh sub pixel, the seventh sub pixel is adjacent to the third sub pixel and the eighth sub pixel, the eighth sub pixel is adjacent to the fourth sub pixel, and the fifth sub pixel, the sixth sub pixel, the seventh sub pixel and the eighth sub pixel are sub pixels with different colors, the method further comprises:

transforming, by the display data transformer, an original data of the fifth sub pixel to generate a first display data of the fifth sub pixel, wherein a brightness of the first display data of the fifth sub pixel is substantially smaller than a brightness of the original data of the fifth sub pixel;

transforming, by the display data transformer, an original data of the sixth sub pixel to generate a first display data of the sixth sub pixel, wherein a brightness of the first display data of the sixth sub pixel is substantially greater than a brightness of the original data of the sixth sub pixel;

transforming, by the display data transformer, an original data of the seventh sub pixel to generate a first display data of the seventh sub pixel, wherein a brightness of the first display data of the seventh sub pixel is substantially smaller than a brightness of the original data of the seventh sub pixel; and transforming, by the display data transformer, an original data of the eighth sub pixel to generate a first display data of the eighth sub pixel, wherein a brightness of the first display data of the eighth sub pixel is substantially greater than a brightness of the original data of the eighth sub pixel;

wherein displaying the first frame of image on the display according to the first display data of the first sub pixel, the first display data of the second sub pixel, the first display data of the third sub pixel and the first display data of the fourth sub pixel is displaying the first frame of image on the display at least according to the first display data of the first sub pixel, the first display data of the second sub pixel, the first display data of the third sub pixel, the first display data of the fourth sub pixel, the first display data of the fifth sub pixel, the first display data of the sixth sub pixel, the first display data of the seventh sub pixel, and the first display data of the eighth sub pixel.

5. An image processing method of a display, comprising:

transforming, by an image data transformer of the display, a three color image data to a four color image data;

generating, by a kernel filter of the display, original data corresponding to a first sub pixel, a second sub pixel, a third sub pixel and a fourth sub pixel disposed in sequence by passing the four color image data through the kernel filter, wherein the second sub pixel is adjacent to the first sub pixel and the third sub pixel, the third sub pixel is adjacent to the fourth sub pixel, and the first sub pixel, the second sub pixel, the third sub pixel and the fourth sub pixel are sub pixels with different colors;

transforming, by a display data transformer of the display, an original data of the first sub pixel to generate a first display data of the first sub pixel, wherein a brightness of the first display data of the first sub pixel is substantially greater than a brightness of the original data of the first sub pixel;

transforming, by the display data transformer, an original data of the second sub pixel to generate a first display data of the second sub pixel, wherein a brightness of the first display data of the second sub pixel is substantially greater than a brightness of the original data of the second sub pixel;

transforming, by the display data transformer, an original data of the third sub pixel to generate a first display data of the third sub pixel, wherein a brightness of the first display data of the third sub pixel is substantially smaller than a brightness of the original data of the third sub pixel;

transforming, by the display data transformer, an original data of the fourth sub pixel to generate a first display data of the fourth sub pixel, wherein a brightness of the first display data of the fourth sub pixel is substantially smaller than a brightness of the original data of the fourth sub pixel; and displaying, by a display panel of the display, a first frame of image on the display at least according to the first display data of the first sub pixel, the first display data of the second sub pixel, the first display data of the third sub pixel, and the first display data of the fourth sub pixel.

6. The method of claim 5, further comprising:

transforming, by the display data transformer, the original data of the first sub pixel to generate a second display data of the first sub pixel, wherein a brightness of the second display data of the first sub pixel is substantially smaller than the brightness of the original data of the first sub pixel;

transforming, by the display data transformer, the original data of the second sub pixel to generate a second display data of the second sub pixel, wherein a brightness of the second display data of the second sub pixel is substantially smaller than the brightness of the original data of the second sub pixel;

transforming, by the display data transformer, the original data of the third sub pixel to generate a second display data of the third sub pixel, wherein a brightness of the second display data of the third sub pixel is substantially greater than the brightness of the original data of the third sub pixel;

transforming, by the display data transformer, the original data of the fourth sub pixel to generate a second display data of the fourth sub pixel, wherein a brightness of the second display data of the fourth sub pixel is substantially greater than the brightness of the original data of the fourth sub pixel; and displaying, by the display panel, a second frame of image on the display according to the second display data of the first sub pixel, the second display data of the second sub pixel, the second display data of the third sub pixel, and the second display data of the fourth sub pixel.

7. The method of claim 5, wherein the first sub pixel, the second sub pixel, the third sub pixel and the fourth sub pixel are sub pixels disposed in a same column or in a same row.

8. The method of claim 5, wherein the four color image data passes through the kernel filter to further generate original data corresponding to a fifth sub pixel, a sixth sub pixel, a seventh sub pixel and an eighth sub pixel disposed in sequence, wherein the fifth sub pixel is adjacent to the first sub pixel, the sixth sub pixel is adjacent to the second sub pixel, the fifth sub pixel and the seventh sub pixel, the seventh sub pixel is adjacent to the third sub pixel and the eighth sub pixel, the eighth sub pixel is adjacent to the fourth sub pixel, and the fifth sub pixel, the sixth sub pixel, the seventh sub pixel and the eighth sub pixel are sub pixels with different colors, the method further comprises:

transforming, by the display data transformer, an original data of the fifth sub pixel to generate a first display data of the fifth sub pixel, wherein a brightness of the first display data of the fifth sub pixel is substantially greater than a brightness of the original data of the fifth sub pixel;

transforming, by the display data transformer, an original data of the sixth sub pixel to generate a first display data of the sixth sub pixel, wherein a brightness of the first display data of the sixth sub pixel is substantially greater than a brightness of the original data of the sixth sub pixel;

transforming, by the display data transformer, an original data of the seventh sub pixel to generate a first display data of the seventh sub pixel, wherein a brightness of the first display data of the seventh sub pixel is substantially smaller than a brightness of the original data of the seventh sub pixel; and transforming an original data of the eighth sub pixel to generate a first display data of the eighth sub pixel, wherein a brightness of the first display data of the eighth sub pixel is substantially smaller than a brightness of the original data of the eighth sub pixel;

wherein displaying the first frame of image on the display according to the first display data of the first sub pixel, the first display data of the second sub pixel, the first display data of the third sub pixel, and the first display data of the fourth sub pixel is displaying the first frame of image on the display at least according to the first display data of the first sub pixel, the first display data of the second sub pixel, the first display data of the third sub pixel, the first display data of the fourth sub pixel, the first display data of the fifth sub pixel, the first display data of the sixth sub pixel, the first display data of the seventh sub pixel, and the first display data of the eighth sub pixel.

9. The method of claim 5, wherein:

the four color image data passes through the kernel filter to further generate original data of a fifth sub pixel from an edge in the four color image data; and displaying the first frame of image on the display according to the first display data of the first sub pixel, the first display data of the second sub pixel, the first display data of the third sub pixel, and the first display data of the fourth sub pixel is displaying the first frame of image on the display at least according to the first display data of the first sub pixel, the first display data of the second sub pixel, the first display data of the third sub pixel, the first display data of the fourth sub pixel, and the original data of the fifth sub pixel.

10. The method of claim 5, wherein:

transforming the original data of the first sub pixel to generate the first display data of the first sub pixel is transforming the original data of the first sub pixel to generate the first display data of the first sub pixel according to a characteristic table of color shift and viewing angle of the display;

transforming the original data of the second sub pixel to generate the first display data of the second sub pixel is transforming the original data of the second sub pixel to generate the first display data of the second sub pixel according to the characteristic table of color shift and viewing angle of the display;

transforming the original data of the third sub pixel to generate the first display data of the third sub pixel is transforming the original data of the third sub pixel to generate the first display data of the third sub pixel according to the characteristic table of color shift to view angle and the display;

transforming the original data of the fourth sub pixel to generate the first display data of the fourth sub pixel is transforming the original data of the fourth sub pixel to generate the first display data of the fourth sub pixel according to the characteristic table of color shift to view angle and the display.

11. An image processing method of a display, wherein the display comprises a plurality of pixels, each of pixel comprises a first color sub pixel, a second color sub pixel, a third color sub pixel and a fourth color sub pixel, sub pixels of a pixel are disposed in a same row, and the method comprises:

inputting a three color image data to an image data transformer of the display, wherein the three color image data comprises a first color data, a second color data and a third color data; and when a grayscale of the first color data is substantially greater than zero and grayscales of the second color data and the third color data are zero, displaying, by a display panel of the display, a grayscale in the first color sub pixel different from the grayscale of the first color data, and displaying, by the display panel, grayscales being zero in the second color sub pixel, the third color sub pixel and the fourth color sub pixel.

12. The method of claim 11, wherein grayscales displayed in first color sub pixels in a same row or in a same column are the same.

13. The method of claim 11, wherein grayscales displayed in first color sub pixels in two adjacent rows or in two adjacent columns are different from each other.

* * * * *